US012192206B2

(12) United States Patent
Wilkinson et al.

(10) Patent No.: US 12,192,206 B2
(45) Date of Patent: Jan. 7, 2025

(54) DYNAMICALLY RECONFIGURING A DATABASE SYSTEM OF A TENANT BASED ON RISK PROFILE(S) OF THE TENANT

(71) Applicant: Salesforce, Inc., San Francisco, CA (US)

(72) Inventors: Samantha Wilkinson, Haverhill, MA (US); Bohan Chen, Los Altos, CA (US); Donald Tam, Hillsborough, CA (US)

(73) Assignee: Salesforce, Inc.

( * ) Notice: Subject to any disclaimer, the term of this patent is extended or adjusted under 35 U.S.C. 154(b) by 377 days.

(21) Appl. No.: 17/449,417

(22) Filed: Sep. 29, 2021

(65) Prior Publication Data

US 2023/0095756 A1 Mar. 30, 2023

(51) Int. Cl.
*H04L 9/40* (2022.01)

(52) U.S. Cl.
CPC ........ *H04L 63/102* (2013.01); *H04L 63/1416* (2013.01); *H04L 63/1425* (2013.01); *H04L 63/1433* (2013.01); *H04L 63/1466* (2013.01)

(58) Field of Classification Search
CPC ... H04L 63/20; H04L 63/102; H04L 63/0853; H04L 63/1416; H04L 63/1425; H04L 63/1433; H04L 63/1441; H04L 63/1466; H04L 9/40; H04L 67/20; H04L 67/22; G06F 17/30315; G06F 17/30339; G06F 17/30362; G06F 17/30371; G06F 17/30575; G06F 17/30923; G06F 16/219; G06F 16/248; G06F 16/285; G06F 16/2322; G06F 16/2474; G06F 16/2477; G06F 17/00

USPC .......................................................... 726/6
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |

(Continued)

*Primary Examiner* — James N Fiorillo
(74) *Attorney, Agent, or Firm* — Lorenz & Kopf, LLP

(57) ABSTRACT

Technologies are provided for dynamically reconfiguring a database system of a tenant that is part of a multi-tenant database system based on risk profile(s) of the tenant. The database system includes database and an application server of the tenant. When a request is received from a client of the tenant, a database transaction having one or more query language patterns can be automatically detected. Query language pattern(s) can be automatically associated with a corresponding transaction category for that tenant, and a corresponding risk profile for that tenant can be determined based on the corresponding transaction category. Based on the corresponding risk profile, it can be determined if a dynamic reconfiguration process should be performed, and if so, system parameter(s) of the database system can be dynamically reconfigured to take action(s) to address one or more risks associated with the corresponding risk profile.

19 Claims, 14 Drawing Sheets

(56) References Cited

U.S. PATENT DOCUMENTS

| | | |
|---|---|---|
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 7,984,073 B1 * | 7/2011 | Basiago ................ G06F 16/22 707/802 |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,053,231 B2 * | 6/2015 | Agrawal ............ G06F 11/3636 |
| 9,485,606 B1 * | 11/2016 | Song .................... H04L 63/1416 |
| 9,886,955 B1 * | 2/2018 | Tetreault ................. G10L 15/26 |
| 10,108,658 B1 * | 10/2018 | Cole .................... G06F 16/2365 |
| 10,423,396 B1 * | 9/2019 | Yang ........................ G06F 8/51 |
| 10,791,168 B1 * | 9/2020 | Dilley .................. H04L 67/288 |
| 10,891,308 B2 | 1/2021 | Chen et al. |
| 10,902,021 B2 | 1/2021 | Chen et al. |
| 11,609,890 B1 * | 3/2023 | Vermeulen ............ G06F 16/219 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2009/0271453 A1 * | 10/2009 | Ben-Natan ............. H04L 63/20 |
| 2011/0247051 A1 | 10/2011 | Bulumulla et al. |
| 2011/0302212 A1 * | 12/2011 | Agrawal ............ G06F 11/3636 707/805 |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0036407 A1 * | 2/2013 | Zheng ................. G06F 11/0709 717/135 |
| 2013/0104236 A1 * | 4/2013 | Ray ........................ H04L 63/20 726/25 |
| 2013/0117353 A1 * | 5/2013 | Wong ................... G06F 16/23 709/203 |

(56) References Cited

U.S. PATENT DOCUMENTS

| | | | |
|---|---|---|---|
| 2013/0158950 A1* | 6/2013 | Cohen | H04L 43/16 702/176 |
| 2013/0212497 A1 | 8/2013 | Zelenko et al. | |
| 2013/0218948 A1 | 8/2013 | Jakobson | |
| 2013/0218949 A1 | 8/2013 | Jakobson | |
| 2013/0218966 A1 | 8/2013 | Jakobson | |
| 2013/0247216 A1 | 9/2013 | Cinarkaya et al. | |
| 2013/0262618 A1* | 10/2013 | Khan | H04L 69/329 709/217 |
| 2015/0172321 A1* | 6/2015 | Kirti | H04L 63/1416 726/1 |
| 2016/0094401 A1* | 3/2016 | Anwar | G06F 11/3006 709/223 |
| 2017/0236188 A1* | 8/2017 | Puck | G06Q 30/0635 705/26.81 |
| 2017/0293873 A1* | 10/2017 | Chrapko | G06Q 40/03 |
| 2018/0173744 A1* | 6/2018 | Barbas | G06F 16/2365 |
| 2018/0287856 A1* | 10/2018 | Whitner | H04L 41/12 |
| 2019/0042782 A1* | 2/2019 | Aylett | G06F 21/6218 |
| 2019/0089711 A1* | 3/2019 | Faulkner | H04L 63/1433 |
| 2019/0102411 A1* | 4/2019 | Hung | G06N 5/025 |
| 2019/0132350 A1* | 5/2019 | Smith | G06F 21/60 |
| 2019/0147068 A1* | 5/2019 | Tuggle | G06F 16/252 707/793 |
| 2019/0207953 A1* | 7/2019 | Klawe | G06F 21/57 |
| 2019/0238525 A1* | 8/2019 | Padmanabhan | H04L 63/101 |
| 2019/0303424 A1* | 10/2019 | Wutscher | G06F 40/12 |
| 2019/0306237 A1* | 10/2019 | Srinivasan | H04L 67/1095 |
| 2019/0377561 A1* | 12/2019 | Yang | G06F 8/51 |
| 2020/0366682 A1* | 11/2020 | Aggarwal | H04L 63/105 |
| 2021/0157945 A1* | 5/2021 | Cobb | G06F 21/32 |
| 2021/0209077 A1* | 7/2021 | Snellman | G06F 16/219 |
| 2021/0374021 A1* | 12/2021 | Santhakumar | G06F 3/0659 |
| 2022/0114174 A1* | 4/2022 | Glass | G06F 16/248 |
| 2022/0358106 A1* | 11/2022 | Krishnamurthy | H04L 67/56 |
| 2022/0374397 A1* | 11/2022 | Wong | G06F 16/2456 |
| 2023/0095756 A1* | 3/2023 | Wilkinson | H04L 63/1416 726/6 |
| 2023/0177201 A1* | 6/2023 | Durand | G06F 21/6227 726/4 |

\* cited by examiner

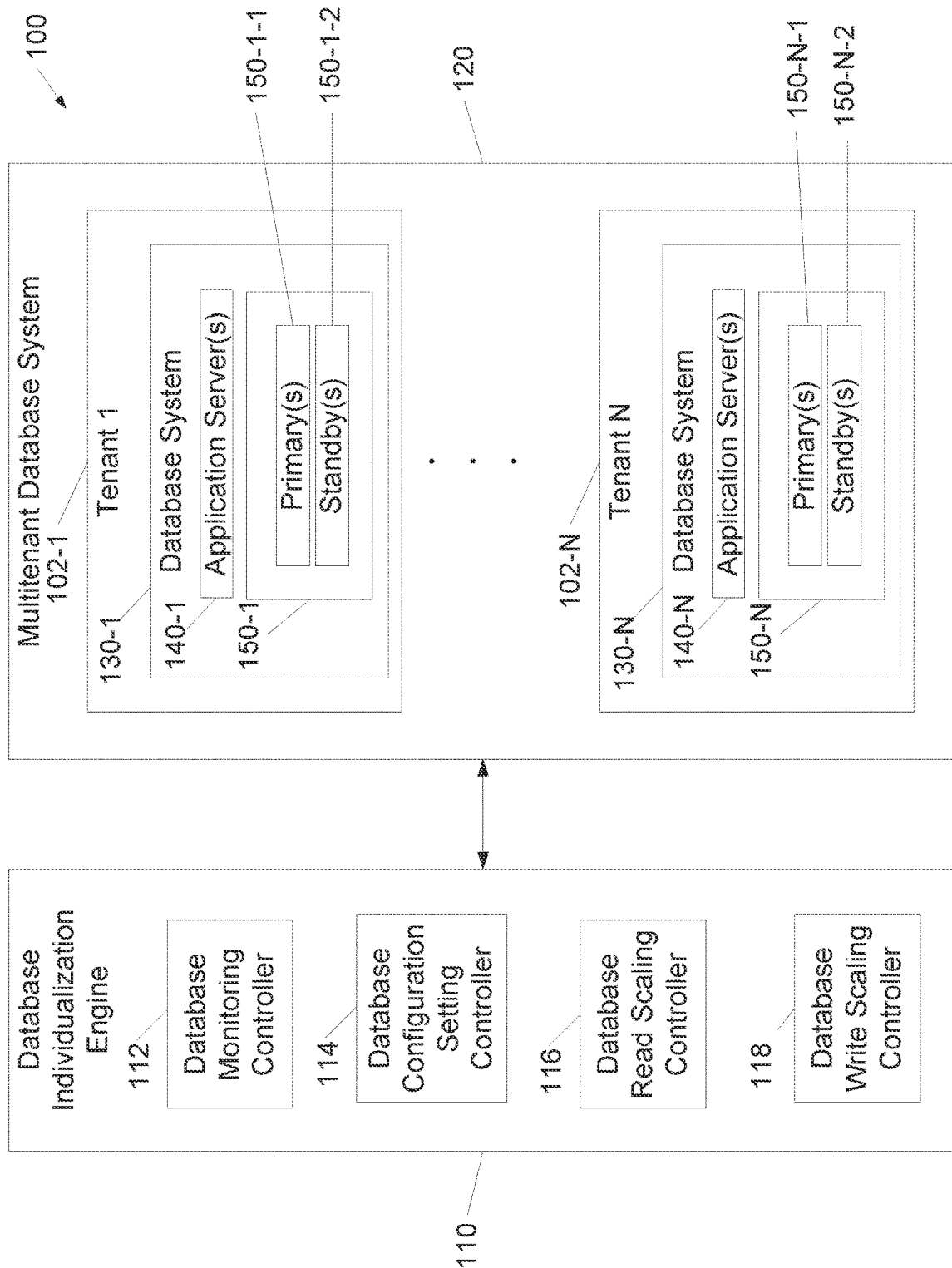

```
# Example 1 - daily merchandise catalog data upload
[
  {Customer: "ABC company"}
  {Transaction Category:
      {Name: "Merchandise Catalog Data Load"}
      {SQL pattern 1: "Insert into PRODUCT"}
      {SQL pattern 2: "Insert into PRODUCT_CATEGORIES"}
      {SQL pattern 3: "Merge PRODUCT"}
      {SQL pattern 4: "Upsert into PRODUCT_TAGS"}
  }
  {Business Risk Profile:
      (Data integrity: "low risk")
      (Performance: "high risk")
      (Availability: "low risk")
  }
]

# Example 2 - critical customer orders
[
  {Customer: "ABC company"}
  {Transaction Category:
      {Name: "Customer Purchase Order"}
      {SQL pattern 1: "insert into PURCHASE_ORDER"}
      {SQL pattern 2: "insert into ORDER_ITEM"}
  }
  {Business Risk Profile:
      (Data integrity: "high risk")
      (Performance: "mid risk")
      (Availability: "high risk")
  }
]

# Example 3 - customer order invoice
[
  {Customer: "XYZ company"}
  {Transaction Category:
      {Name: "Customer Purchase Order Invoice"}
      {SQL pattern 1: "insert into INVOICE"}
      {SQL pattern 2: "update INVOICE"}
      {SQL pattern 3: "insert into INVOICE_HISTORY"}
  }
  {Business Risk Profile:
      (Data integrity: "high risk")
      (Performance: "low risk")
      (Availability: "low risk")
  }
]
```

Labels: 710-1, 720-1, 730-1, 710-2, 720-2, 730-2, 710-3, 720-3, 730-3

FIG. 7

DYNAMICALLY RECONFIGURING A DATABASE SYSTEM OF A TENANT BASED ON RISK PROFILE(S) OF THE TENANT

TECHNICAL FIELD

Embodiments of the subject matter described herein relate generally to cloud computing platforms, and more particularly, embodiments of the subject matter relate to systems and methods for dynamically reconfiguring a database system of a tenant, that is part of a multi-tenant database system, based on risk profile(s) of the tenant.

BACKGROUND

Today many enterprises now use cloud-based computing platforms that allow services and data to be accessed over the Internet (or via other networks). Infrastructure providers of these cloud-based computing platforms offer network-based processing systems that often support multiple enterprises (or tenants) using common computer hardware and data storage. "Cloud computing" services provide shared resources, software, and information to computers and other devices upon request. In cloud computing environments, software can be accessible over the Internet rather than installed locally on in-house computer systems. This "cloud" computing model allows applications to be provided over a platform "as a service" supplied by the infrastructure provider. The infrastructure provider typically abstracts the underlying hardware and other resources used to deliver a customer-developed application so that the customer no longer needs to operate and support dedicated server hardware. Cloud computing typically involves over-the-Internet provision of dynamically scalable and often virtualized resources. Technological details can be abstracted from the users, who no longer have need for expertise in, or control over, the technology infrastructure "in the cloud" that supports them. The cloud computing model can often provide substantial cost savings to the customer over the life of the application because the customer no longer needs to provide dedicated network infrastructure, electrical and temperature controls, physical security, and other logistics in support of dedicated server hardware.

Multi-tenant cloud-based architectures have been developed to improve collaboration, integration, and community-based cooperation between customer tenants without compromising data security. Generally speaking, multi-tenancy refers to a system where a single hardware and software platform simultaneously supports multiple organizations or tenants from a common data storage element (also referred to as a "multi-tenant database"). The multi-tenant design provides a number of advantages over conventional server virtualization systems. First, the multi-tenant platform operator can often make improvements to the platform based upon collective information from the entire tenant community. Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture therefore allows convenient and cost-effective sharing of similar application feature software between multiple sets of users.

In general, businesses use a customer relationship management (CRM) system (also referred to as a database system or system) to manage business relationships and information associated with the business relationship. For example, a multi-tenant system may support an on-demand CRM application that manages the data for a particular organization's sales staff that is maintained by the multi-tenant system and facilitates collaboration among members of that organization's sales staff (e.g., account executives, sales representatives, and the like). This data may include customer and prospect contact information, accounts, leads, and opportunities in one central location. The information may be stored in a database as objects. For example, the CRM system may include "account" object, "contact" object and "opportunities" object.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 1 is a block diagram that illustrates a cloud computing system in accordance with the disclosed embodiments.

FIG. 7 is an that illustrates three non-limiting examples of code for database transactions in accordance with the disclosed embodiments.

DETAILED DESCRIPTION

Figure 2A:
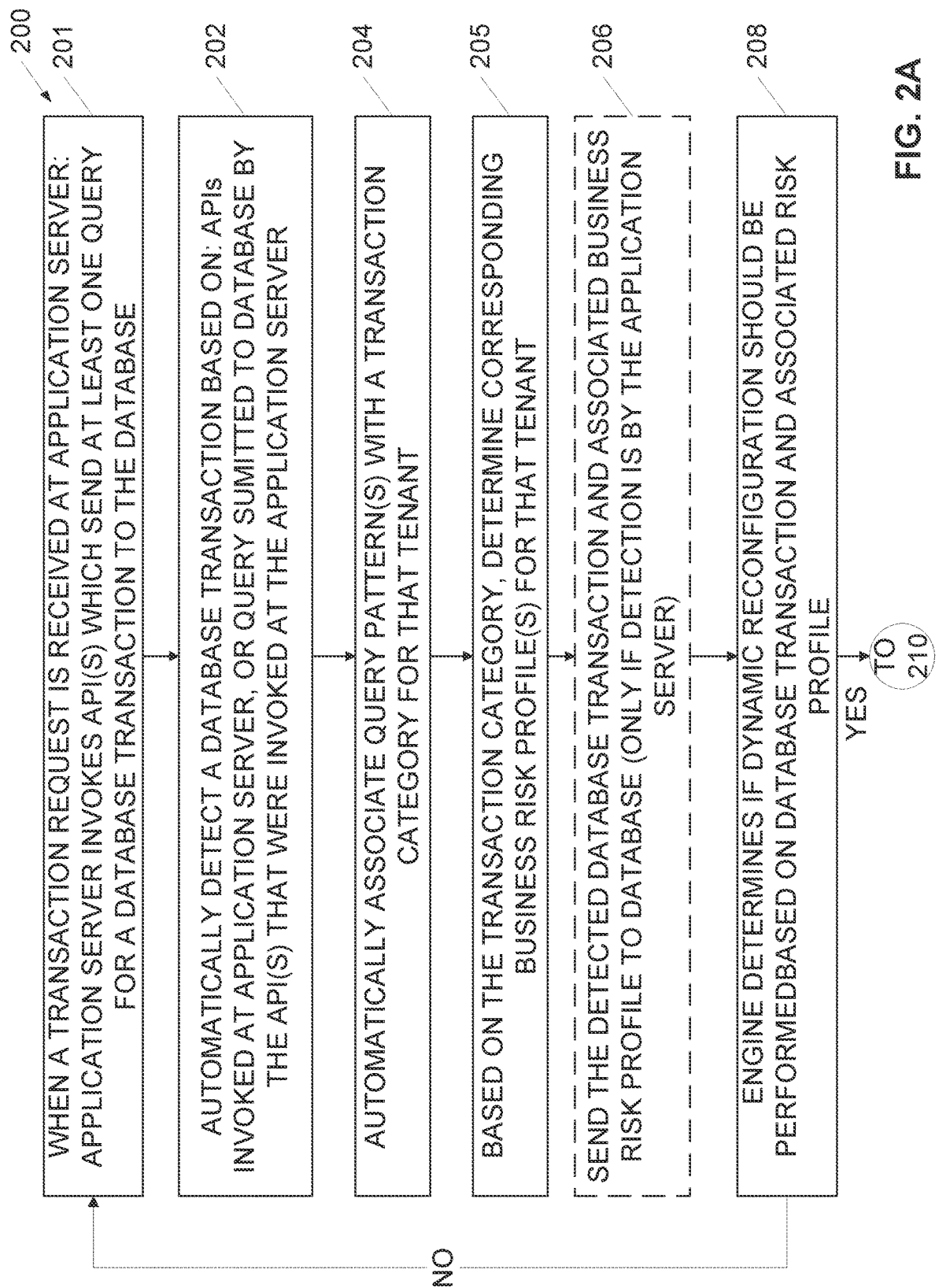
FIGS. 2A and 2B are collectively a flow chart that illustrates a method for dynamically reconfiguring a database system of a particular tenant based on risk profile(s) of that tenant in accordance with the disclosed embodiments.

Some cloud-based computing platforms, customers of the platform can be assigned dedicated computing resources including application servers and production databases including primary database and one or more standby databases. For example, in some cloud computing platforms that provide a multi-tenant database system each tenant may be assigned their own application server(s) and database(s) that are managed by the cloud computing platform. Individual tenant or customer databases of such multi-tenant database system are typically configured in a relatively generic way. For example, individual tenant or customer databases may be configured (e.g., manually set) with generic system parameters, such as, configuration settings, monitoring and alerting thresholds, etc. at the infrastructure component level based on infrastructure health or utilization. For instance, infrastructure layer configuration settings (e.g., size of compute virtual machines, storage, app servers, etc.) can be managed by the cloud computing platform, whereas upper layer application configuration setting can be managed by an administrator of an individual tenant (e.g., how many concurrent reports can a particular user account run, within this tenant).

One issue with this approach is that the configuration of system parameters generally focuses on infrastructure health or utilization, but does not take into account other factors that differentiate individual tenants or the variations of each tenant at different times. For example, each tenant can have unique workload characteristics. Each tenant may also have different business risk profiles, different requirements for Recovery-Time-Objective (RTO) that defines a targeted duration of time and a service level within which a service should be restored after a disaster, different requirements for Recovery-Point-Objective (RPO) that defines a targeted maximum period of data that may be lost due to a disaster, etc. In addition, even for the same tenant, the resource requirements and business risk profiles for workloads may vary during different times of the day or different days of the month or year. For example, a daily merchandise catalog data load has a lower risk than a product order transaction submitted by a consumer during a holiday sale because the catalog data load can be interrupted and can be resumed or resubmitted without any tenant data loss, whereas this is not to with a product order transaction submitted by a consumer during a holiday sale.

As such, the current approaches that are used to configure system parameters fail to account the unique demands of each individual tenant's business operations that drive their workloads and the associated business risk profiles. One drawback of failing to take into account the business operation semantics and associated business risk profiles of each individual tenant is that it can lead to infrastructure and resource inefficiency, can generate noisy alerts that do not lead to actions, etc. It would be desirable to provide technologies and technological solutions that can allow for system parameters (e.g., configuration settings and monitoring thresholds, etc.) of a database system to be dynamically reconfigured based on the unique workload and business risk profile(s) of each tenant of the multitenant database system at any given time.

The disclosed embodiments can provide technologies for dynamically reconfiguring a database system of a tenant based on risk profile(s) of the tenant (e.g., business risk profile(s) of the tenant. As used herein, the term "risk profile" can refer to a tenant-specific risk impact and measurements on one or more activities of the tenant. There are different types of risk profiles including, for example, one or more of an operation risk profile, a database transaction risk profile, and an application workload risk profile, a processing time or performance service level agreement risk profile, a data integrity risk profile, an availability risk profile, and/or a security risk profile, etc. The database system of the tenant is part of a multi-tenant database system. The database system of the tenant includes a database and an application server of the tenant. For example, when a request is received at the application server from a client of the tenant, a database transaction can be automatically detected. The detected database transaction has one or more query language patterns. As used herein, the term "query language" can include any known type of database query language or information retrieval query language, including but not limited to, structured query language (SQL), stored procedures, Salesforce Object Query Language (SOQL), Salesforce Object Search Language (SOSL), Programming Language/PostgreSQL (PL/psSQL), etc. The application server, or the database, can automatically associate the detected query language pattern(s) with a corresponding transaction category for that tenant, and based on the corresponding transaction category, a corresponding risk profile for that tenant can be determined. The detected database transaction can be sent along with the corresponding risk profile to an engine, where it can be determined if a dynamic reconfiguration process should be performed, and if so, system parameter(s) of the database system can be dynamically reconfigured to take one or more actions to address one or more risks associated with the corresponding risk profile.

In one embodiment, methods, systems, and non-transitory computer-readable medium are provided for dynamically reconfiguring a database system of a tenant based on one or more risk profiles of the tenant. The database system of the tenant is part of a multi-tenant database system that comprises at least one other database system of another tenant. The database system of the tenant comprises at least one database and at least one application server of the tenant.

In response to a request received at the application server from a client of the tenant, at least one database transaction can be automatically detected. The detected database transaction has one or more query language patterns. For example, in one embodiment, an application programming interface can be invoked at the application server in response to the request, and the at least one database transaction can be automatically detected at the application server based on the application programming interface invoked at the application server. The detected database transaction can then be sent, along with the corresponding risk profile, from the application server to the database. In another embodiment, an application programming interface can be invoked at the application server, in response to the request, to generate a query (or queries) that include one or more query language statements, and the at least one database transaction can be automatically detected at the database based on the query (or queries) submitted to the database.

Either the application server or the database can automatically associate the one or more query language patterns with a corresponding transaction category for that tenant, and a corresponding risk profile for that tenant can be determined based on the corresponding transaction category.

The detected database transaction can be sent with the corresponding risk profile from the database to an engine, where it can be determined if a dynamic reconfiguration process should be performed. If so, one or more system parameters of the database system can be dynamically reconfigured to take one or more actions to address one or more risks associated with the corresponding risk profile.

For example, in one embodiment, a database monitoring and alerting system can dynamically adjust one or more monitoring thresholds, based on the corresponding risk profile associated with the detected database transaction, to adapt them to the corresponding risk profile associated with the detected database transaction. Examples of the monitoring thresholds that can be dynamically adjusted can include, for example, one or more of: database replication lag thresholds; central processing unit (CPU) utilization thresholds; input-output (TO) latency and throughput thresholds; storage space usage thresholds; request rate thresholds; network bandwidth thresholds; database request response time thresholds; database request error rate thresholds; database connection pool size thresholds; and database process thresholds.

For example, in another embodiment, a database configuration management system can dynamically change one or more database configuration settings of the database, based on the corresponding risk profile associated with the detected database transaction, to adapt them to the risk profile associated with the detected database transaction. Examples of the database configuration settings of the database that can be dynamically changed can include, for example, one or more of: database replication mode; database transaction logging mode; database checkpoints interval; resource allocation or throttle; and request rate throttle. In one embodiment, when dynamically changing one or more database configuration settings of the database based on the risk profile does not satisfy workload scaling requirements, an auto-scaling process can be invoked to add one or more additional databases and scale out read operations and/or write operations of the database to the one or more additional databases.

In one embodiment, for any detected database transaction that is not able to be categorized in a transaction category by the application server or the database, the detected database transaction can be inspected at the engine, which can then send an instruction to a database monitoring and alerting system to set request rate alert and resource usage alert; and/or sending another instruction to a database configuration management system to change one or more of: (1) a rate limit to throttle the transaction if the request rate alert is triggered, and/or (2) a resource usage limit to throttle the transaction if the resource usage alert is triggered.

In one embodiment, the engine generates risk profiles based on input data for that tenant that can include, for example, historical database usage patterns of the tenant comprising: historical workload and transaction data for the tenant; planned upcoming events of the tenant; planned application features of the tenant; and/or feeds from other systems.

In one embodiment, when the one or more query language patterns from the detected database transaction cannot be automatically associated with a corresponding risk profile for that tenant, information about the detected database transaction can be sent to the engine, and the detected database transaction can be added to a pool of historical data for further analysis so that the detected database transaction can be added to a transaction category and associated with a risk profile.

In one implementation, the disclosed technologies can provide a system for dynamic and individualized configuring and setting monitoring thresholds (e.g., alerting or reporting thresholds) for a database that is part of a multi-tenant cloud-computing environment. For instance, the system can dynamically and automatically adjust alert thresholds and configuration settings for an individual tenant database, based on individual tenant's business operations, workloads, associated risk profiles, and requirements for things such as performance, Recovery-Time-Objective (RTO), Recovery-Point-Objective (RPO), etc.

FIG. 1 is a block diagram that illustrates a cloud computing system 100 in accordance with the disclosed embodiments. The cloud computing system 100 includes a database individualization engine 110 and a multi-tenant database system 120. The database individualization engine 110 can be implemented as part of the multi-tenant database system 120, or externally to it. In either implementation, a communication mechanism, as represented by the double-headed arrow that links them, is provided that allows the database individualization engine 110 and the multi-tenant database system 120 to communicate information with each other as will be described below. The database individualization engine 110 and the multi-tenant database system 120 can be implemented in various ways as described herein. Various implementation details regarding the multi-tenant database system 120 will also be described herein. Acts and interactions corresponding to any of the features described above, and/or substantially equivalent acts and interactions, will now be described below. These acts and interactions can be performed by a computer processor, or multiple computer processors, in any form, that execute processor-readable instructions stored or included on a processor-readable medium.

The multi-tenant database system 120 can include any number of tenants 102 (that are labeled as 102-1 . . . 102-N in FIG. 1). In the simplified example that is illustrated in FIG. 1, the tenant 102-1 on one tenant of the multi-tenant database system 120, and the tenant 102-N is another tenant of the multi-tenant database system 120. The multi-tenant database system 120 includes infrastructure for multiple tenants 102-1 . . . 102-N that is assigned to each tenant 102. Each tenant 102-1 . . . 102-N can have its own database system 130 that includes any number of application servers 140 and any number of databases 150. For example, in the non-limiting example of FIG. 1, the database system 130-1 of the tenant 102-1 includes at least one application server 140-1 and at least one database 150-1 of the tenant 102-1. The database 150-1 can include at least one primary database 150-1-1 and any number of other standby databases 150-1-2. Similarly, the database system 130-N of the tenant 102-N includes at least one application server 140-N and at least one database 150-N of the tenant 102-N. The database 150-N can include at least one primary database 150-N-1 and any number of other standby databases 150-N-2.

As will be described below, in accordance with the disclosed embodiments, the database individualization engine 110 can automatically and dynamically reconfigure a database system 130-1 (e.g., primary database 150-1-1 and/or standby database 150-1-2) of a particular tenant 102-1 based on one or more risk profile(s) of that tenant 102-1, such as business risk profile(s) of the that tenant 102-1. The database individualization engine 110 includes a database monitoring controller 112, a database configuration setting controller 114, a database read scaling controller 116, and a database write scaling controller 118. Various features of the database individualization engine 110 and the sub-components 112-118 thereof will be described in greater detail below.

The database individualization engine 110 can learn and generate risk profiles based on input data for that tenant 102-1 that can include, for example, historical database usage patterns of the tenant 102-1. Various artificial intelligence and machine learning technologies can be applied to learn the risk profiles based on the input data for that tenant 102-1. Examples of historical database usage patterns of the tenant 102-1 can include, but are not limited to: historical workload and transaction data for the tenant 102-1; planned upcoming events of the tenant 102-1 (e.g., a flash sale next week, a holiday promotion, etc.); planned application features of the tenant 102-1; and/or feeds from other systems, such as artificial intelligence based systems, machine learning based systems, data warehousing, enterprise resource planning systems, marketing systems, other commercial systems. In one embodiment, the database individualization engine 110 can utilize artificial intelligence and/or machine learning techniques to process the input data for that tenant 102-1 to generate the risk profiles.

Automated and Dynamic Reconfiguration of a Database System

When a client (not shown) of the tenant 102-1 uses and interacts with an application that is served by application server 140-1, this causes a request to be sent to the application server 140-1. The client is an end user of the application, and can be, for example, a customer of the tenant 102-1 (or of an organization that the tenant 102-1 is part of as will be described in greater detail below). In response to the request, the application server 140-1 can invoke one or more application programming interfaces (APIs). The invoked API(s) can generate and submit a query or queries for a database transaction to the database 140-1. Each query can include one or more statements in accordance with a given query language (QL) (e.g., select, insert, update, delete, etc. when the query language is SQL). Based on either the API(s) invoked at the application server 140-1, or the query (or queries) submitted to the database 150-1, a database transaction can be automatically detected. The detected database transaction can have one or more query language patterns.

In one embodiment, the database transaction can be automatically detected by the application server 140-1 based on the API(s) that were invoked/called at the application server 140-1 in response to the request. For instance, in one implementation, an application (not shown) at the application server 140-1 can inspect the database transaction including the data, the query or queries, data schema (table, users, etc.), etc., constructed by the application programming interface (API) that was invoked at the application server 140-1. In another embodiment, the database transaction can be automatically detected by the database 150-1 based on the query language of query (or queries) that were submitted to the database 150-1.

In accordance with the disclosed embodiments, each transaction category can have an associated risk profile for a particular tenant (e.g., each transaction category can have an associated risk profile that is associated with that particular tenant. Each transaction category can have at least one query language pattern, and potentially many or multiple query language patterns. As will be explained below, the application server 140-1, the database 150-1, or the database individualization engine 110 can analyze the query language patterns to determine a transaction category and the associated risk profile for that transaction category. In cases where the application server 140-1 or the database 150-1 determine the associated risk profile for a detected database transaction, those entities can provide that information to the database individualization engine 110.

For example, query language pattern(s) from the query (or queries) can be automatically associated with a corresponding transaction category for that tenant 102-1, and then based on the corresponding transaction category from 204, a corresponding risk profile for that tenant 102-1 can be determined and attached/tagged to the database transaction.

In some scenarios, the query language pattern(s) associated with the detected database transaction cannot be automatically associated with a corresponding transaction category for that tenant 102-1, or a corresponding risk profile for that tenant 102-1 cannot be determined, in which case the detected database transaction can be flagged for further processing as will be described below.

Based on the associated risk profile for a detected database transaction, the database individualization engine 110 can determine if a dynamic reconfiguration process should be performed. When the database individualization engine 110 determines that a dynamic reconfiguration process should be performed, it can cause one or more system parameters of the database system 130-1 to be dynamically reconfigured to take one or more actions (e.g., corrective actions) to address one or more potential risks associated with the corresponding risk profile. Example of system parameters of the database system 130-1 that can be dynamically reconfigured can include monitoring thresholds and database configuration setting(s) of the database 150-1.

For example, based on the corresponding risk profile associated with the detected database transaction, the database individualization engine 110 can send an instruction to the database monitoring controller 112 to dynamically adjust one or more monitoring thresholds (e.g., to adapt them to the corresponding risk profile associated with the detected database transaction). Examples of "monitoring" thresholds (including alerting thresholds and reporting thresholds that are part of monitoring processes) will be described below, for example, with reference to FIG. 2B.

As another example, the database individualization engine 110 can send an instruction to the database configuration setting controller 114 to dynamically change one or more database configuration settings of the database 150-1 based on the corresponding risk profile associated with the detected database transaction (e.g., to adapt them to the corresponding risk profile associated with the detected database transaction). Some non-limiting examples of the database configuration settings of the database 150-1 that can be dynamically changed can include, for example, one or more of: database replication mode; database transaction logging mode; database checkpoints interval; resource allocation or throttle; request rate throttle, etc. Examples of configuration settings will be described in greater detail below, for example, with reference to FIG. 2B.

When dynamically changing one or more database configuration settings of the database 150-1 does not satisfy workload scaling requirements for a given workload, one or more auto-scaling processes 116, 118 can be invoked. The auto-scaling processes can automatically add one or more additional databases to the database system 130-1. For example, for read-scaling, the auto-scaling processes can automatically add one or more additional standby databases 150-1-2 to the database system 130-1. By contrast, for write-scaling, the auto-scaling processes can automatically add one or more additional primary databases 150-1-1 to the database system 130-1 and data can be partitioned between the primary databases to scale the write operations. The auto-scaling processes can utilize the database read scaling controller 116 to scale out read operations of the database 150-1 to the one or more additional standby databases 150-1-2 that are added. Additionally, or alternatively, the auto-scaling processes can utilize the database write scaling controller 118 to scale out write operations of the database 150-1 to the one or more additional primary databases 150-1-1 that are added. A detailed description of some auto-scaling implementations is discussed in commonly assigned U.S. Pat. No. 10,891,308 B2, titled "Automated self-scaling database system for automatically scaling out write operations and method for implementing the same in a multi-tenant, cloud-based computing environment," by Bohan Chen, issued on Jan. 12, 2021, and in commonly assigned U.S. Pat. No. 10,902,021 B2, titled "Automated self-scaling database system for automatically scaling out read operations and method for implementing the same,", by Bohan Chen, issued on Jan. 26, 2021, which are hereby incorporated by reference in their entirety, except for any disclaimers, disavowals, and inconsistencies, and to the extent that the incorporated material is inconsistent with the express disclosure herein, the language in this disclosure controls, and any inconsistent or conflicting information in the incorporated material is not incorporated by reference herein.

If the query language pattern(s) associated with the detected database transaction cannot be automatically associated with a corresponding transaction category for that tenant 102-1, or if the corresponding risk profile for that tenant 102-1 cannot be determined (e.g., it has not yet been created), then the detected database transaction can be flagged for further processing. For example, for any detected database transaction that is not able to be categorized in a transaction category, the database individualization engine 110 can inspect the detected database transaction, can then send an instruction to the database monitoring controller 112 to set request rate alert and/or resource usage alert. The database individualization engine 110 can send another instruction to the database configuration setting controller 114 to change, for example, one or more of: (1) a rate limit to throttle the transaction if a request rate alert is triggered, and/or (2) a resource usage limit to throttle the transaction if a resource usage alert is triggered.

FIGS. 2-6 are flow charts that illustrates examples of methods in accordance with the disclosed embodiments. With respect to FIGS. 2-6, the steps of each method shown are not necessarily limiting. Steps can be added, omitted, and/or performed simultaneously without departing from the scope of the appended claims. Each method may include any number of additional or alternative tasks, and the tasks shown need not be performed in the illustrated order. Each method may be incorporated into a more comprehensive procedure or process having additional functionality not described in detail herein. Moreover, one or more of the tasks shown could potentially be omitted from an embodiment of each method as long as the intended overall functionality remains intact. Further, each method is computer-implemented in that various tasks or steps that are performed in connection with each method may be performed by software, hardware, firmware, or any combination thereof. For illustrative purposes, the following description of each method may refer to elements mentioned above in connection with FIG. 1. In certain embodiments, some or all steps of this process, and/or substantially equivalent steps, are performed by execution of processor-readable instructions stored or included on a processor-readable medium. For instance, in the description of FIGS. 2-6 that follows, the certain elements of FIG. 1 can be described as performing various acts, tasks or steps, but it should be appreciated that this refers to processing system(s) of these entities executing instructions to perform those various acts, tasks or steps. Depending on the implementation, some of the processing system(s) can be centrally located, or distributed among a number of server systems that work together.

Figure 2B:
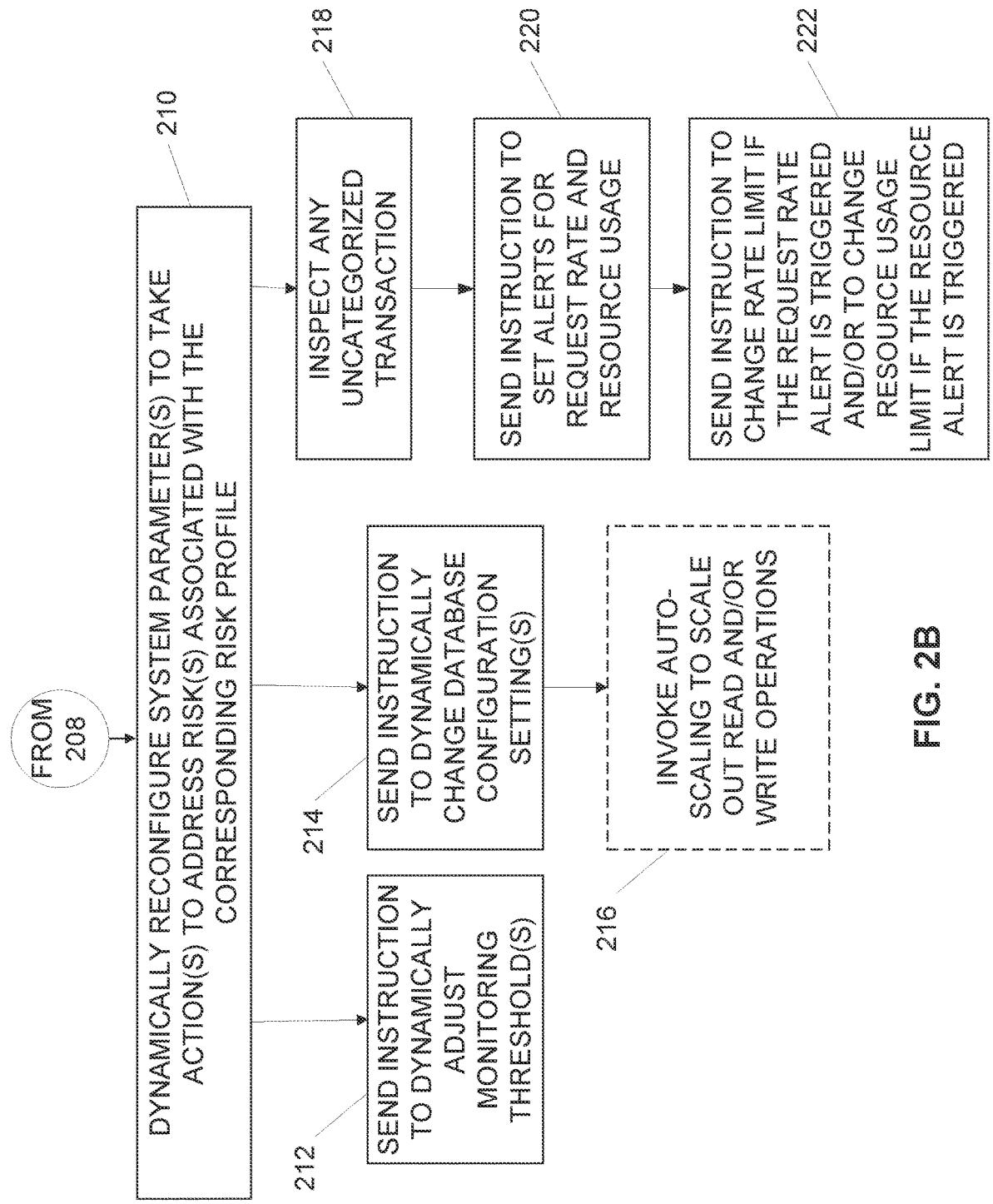

FIGS. 2A and 2B are collectively a flow chart that illustrates a method 200 for dynamically reconfiguring a database system 130-1 of a particular tenant 102-1 based on risk profile(s) of that tenant 102-1 in accordance with the disclosed embodiments. The database system 130-1 of the tenant 102-1 includes at least one application server 140-1 and at least one database 150-1 of the tenant 102-1. As described above, the database system 130-1 of the tenant 102-1 is part of a multi-tenant database system 120 that includes any number of other database systems 130-N for any number of other tenants 102-N.

Method 200 begins at 201, where a request to be sent to the application server 140-1 when a client (not shown) of the tenant 102-1 uses and interacts with an application that is served by application server 140-1. In response to the request, the application server 140-1 can invoke one or more application programming interfaces (APIs), and the invoked API(s) can generate and send one or more queries for a database transaction to the database 140-1. Each query can include one or more statements in accordance with a given query language (QL) (e.g., select, insert, update, delete, etc. when the query language is SQL).

At 202, the database transaction can be automatically detected based on either the API(s) invoked at the application server 140-1, or the query (or queries) submitted to the database 150-1. In other words, the detection can be done at either the DB-tier or at the Application-tier of the database system 130-1. The detected database transaction can have one or more query language patterns.

To explain further, the application server 140-1 provides application programming interfaces for tenants to construct the workload and transactions for the database 150-1, and in one scenario at 202, the database transaction can be automatically detected by the application server 140-1 based on the application programming interface(s) that were invoked/called at the application server 140-1. In another scenario at 202, the database transaction can be automatically detected by the database 150-1 based on the query (or queries) submitted to the database 150-1.

As described above, in one embodiment, the database individualization engine 110 can learn and generate risk profiles based on input data for that tenant 102-1 that can include, for example, historical database usage patterns of the tenant 102-1. In accordance with the disclosed embodiments, each transaction category can have an associated risk profile for a particular tenant (e.g., each transaction category can have an associated risk profile that is associated with that particular tenant. Each transaction category can have at least one query language pattern, and potentially many or multiple query language patterns.

As will be explained below with reference to step 204, the database transaction can be analyzed for query language patterns, and the query language patterns can then be analyzed to determine a transaction category and the associated risk profile for that transaction category. Depending on the implementation, this analysis can be done, for example, at the application server 140-1, the database 150-1, or the database individualization engine 110.

At 204, query language pattern(s) from the query (or queries) can be automatically associated with a corresponding transaction category for that tenant 102-1. As noted above, depending on the scenario or implementation, this automatic association can happen at the application server 140-1, the database 150-1, or the database individualization engine 110. In other words, either the application server 140-1, the database 150-1 or the database individualization engine 110 can automatically associate the one or more query language patterns with a corresponding transaction category for that tenant 102-1. In some scenarios, at 204, the query language pattern(s) associated with the detected database transaction cannot be automatically associated with a corresponding transaction category for that tenant 102-1. In these scenarios alternative processing is performed. For example, if the query language pattern(s) associated with the detected database transaction cannot be automatically associated with a corresponding transaction category for that tenant 102-1 (at 204), then the detected database transaction can be flagged for further processing as will be described with respect to 218-222.

At 205, based on the corresponding transaction category from 204, a corresponding risk profile for that tenant 102-1 can be determined and attached/tagged to the database transaction. As noted above, depending on the scenario or implementation, this determination (at 205) can happen at the application server 140-1, the database 150-1, or the database individualization engine 110. In other words, either the application server 140-1, the database 150-1 or the database individualization engine 110 can determine a corresponding risk profile for that tenant 102-1 based on the corresponding transaction category. In some scenarios, at 205, a corresponding risk profile for that tenant 102-1 cannot be determined at 204, and the method 200 can proceed as will be described below with reference to FIG. 3.

Step 206 is shown in a dotted-line because it is optional and is performed in cases when step 204 is performed by the application server 140-1. In other words, when steps 204 and 205 are performed by the database 150-1 step 206 is unnecessary. At 206, the detected database transaction can be sent, along with the corresponding risk profile, from the application server 140-1 to the database 150-1.

At 208, the detected database transaction can be sent along with the corresponding risk profile from the database 150-1 to the database individualization engine 110, where it can be determined if a dynamic reconfiguration process should be performed. When the database individualization engine 110 determines (at 208) that a dynamic reconfiguration process should not be performed, the method 200 loops back to 201.

By contrast, when the database individualization engine 110 determines (at 208) that a dynamic reconfiguration process should be performed, the method 200 proceeds to 210, where one or more system parameters of the database system 130-1 can be dynamically reconfigured to take one or more actions (e.g., corrective actions) to address one or more potential risks associated with the corresponding risk profile. In other words, the database individualization engine 110 can dynamically configure the database 140-1 to address potential risks associated with the corresponding risk profile.

One example of system parameters of the database system 130-1 that can be dynamically reconfigured at 210 is shown at 212. At 212, the database individualization engine 110 can send an instruction to the database monitoring controller 112 to dynamically adjust one or more monitoring thresholds, based on the corresponding risk profile associated with the detected database transaction, to adapt them to the corresponding risk profile associated with the detected database transaction. As used herein, "monitoring" thresholds can encompass monitoring thresholds, as well as alerting thresholds and reporting thresholds that are part of monitoring processes. In this regard, monitoring thresholds can refer to values that are set for system metrics. Some events or actions may be triggered automatically when the threshold values are exceeded or fall below for one or more metrics. Some common actions that may be triggered can include alerting and reporting. Alerting thresholds can refer to thresholds set to alert the operator or another system to take action. For example, a monitoring system can be configured as follows: when a metric being monitored is exceeds or falls below an alerting threshold, alerts or messages can be generated and sent to another corresponding system or operators to take action. Alerting can indicate some critical conditions of the system, such as healthiness, performance, availability, and more. Reporting thresholds can refer to thresholds that are informational. For example, when a metric being monitored is exceeds or falls below a reporting threshold may indicate the system load is increasing to above average but not yet at the critical or alerting stage.

Examples of the monitoring thresholds that can be dynamically adjusted can include, for example, one or more of:

Database replication lag thresholds that indicate or specify the number of transactions that are committed on the primary database but not yet committed on the standby database, usually measured in terms of time period. For example, a replication lag threshold can be set as 30 seconds. If the standby database is committing a transaction replicated from the primary database that was committed 40 seconds ago, the replication lag is thus 40 seconds and exceeds the 30-second threshold. An alert can be generated to indicate that the replication lag is beyond a targeted Recovery-Point-Objective (RPO). For a non-critical transaction, the replication lag threshold can be relaxed (to set the threshold at a higher value) as the risk is lower.

Central processing unit (CPU) utilization thresholds that indicate or specify the CPU usage as percentage of the total CPU capacity. For example, the CPU utilization threshold can be set as 60%. If the CPU utilization is measured at 70%, an alert is generated to indicate that the system may be overloaded. For critical transactions, the CPU utilization threshold can be set higher to increase the CPU capacity allowed for processing this transaction. Input-output (IO) latency and throughput thresholds that indicate or specify the threshold values for IO latency measured in millisecond (ms), and IO throughput measured in Megabytes per second (MB/s). For example, an IO latency threshold can be set at 5 ms. If the latency is measured at 10 ms, an alert is generated the IO performance is below the target.

Storage space usage thresholds that indicate or specify the storage space used or allocated in Megabytes (MB), Gigabytes (GB), or Terabytes (TB). For example, a storage usage threshold can be set as 100 TB for a tenant. If a tenant allocates more than 100 TB storage space, an alert can be generated to indicate the storage capacity may be exhausted.

Request rate thresholds (request per second, active sessions, etc.) that indicate or specify the number of requests received by the application or the database during a period of time or the active working session on a database during a period of time. For example, the request rate threshold can be set to 100 requests per second. If the database receives 120 requests in the past second, an alert can be generated to indicate that the database may be overloaded.

Network bandwidth thresholds that indicate or specify the threshold of the network bandwidth usage, measured in Megabytes per second. For example, the network bandwidth threshold can be set to 100 MB/s. If the network interface detects 120 MB/s of network usage, an alert can be generated to indicate that the network may be saturated.

Database request response time thresholds that indicate or specify the threshold of the time it takes for a database to process a request. For example, the response time threshold can be set to 500 ms. If a database request takes 600 ms to process, an alert can be generated to indicate performance risks.

Database request error rate thresholds that indicate or specify the ratio of the number of errors returned by the database to the total number of the requests during a period of time. For example, a threshold of 1% can be set for the database request error rate. If during the past one second, a total of 100 requests were received and three of the requests returned errors, the error rate is thus 3% and exceeds the 1% threshold. An alert can be generated to indicate possible database issues.

Database connection pool size thresholds that indicate or specify the size and the usage of the database connection pool. For example, the connection pool size threshold can be set as 500 connections. If the connection pool grows to 510, an alert is generated to indicate possible resource exhaustion.

Database process thresholds (e.g., that indicate or specify the number of database processes allowed by the Operating Systems). For instance, in one non-limiting example, the database individualization engine 110 can send an instruction to the database monitoring controller 112 to increase the maximum replication lag and IO consumption (input/output per second, bandwidth, and throughput usage) alerting threshold to allow a low data integrity risk data load transaction to proceed without triggering alerts.

Another example of system parameters of the database system 130-1 that can be dynamically reconfigured at 210 is shown at 214. At 214, the database individualization engine 110 can send an instruction to the database configuration setting controller 114 to dynamically change one or more database configuration settings of the database 150-1, based on the corresponding risk profile associated with the detected database transaction, to adapt them to the risk profile associated with the detected database transaction. Non-limiting examples of the database configuration settings of the database 150-1 that can be dynamically changed can include, for example, one or more of: database replication mode; database transaction logging mode; database checkpoints interval; resource allocation or throttle; request rate throttle, etc.

The database replication mode can specify an asynchronous replication mode or a synchronous replication mode. When a transaction is committed in the database, the transaction (in the form of logs) will be replicated to a standby database for data redundancy and availability. This way, if the primary database fails, the standby database can assume the primary database role. As a non-limiting example, for a critical transaction (e.g., an "order"), the database individualization engine 110 can send an instruction to the database configuration setting controller 114 to change the database replication mode from asynchronous to synchronous to avoid any data loss if the primary database crashes.

The database transaction logging mode can indicate or specify a logging mode in which transaction logging is enabled, or a no-logging mode in which transaction logging is disabled. For example, in some implementations, logging may be enabled for critical transactions so that the transaction log will be enabled and replicated to a standby database, whereas logging may be disabled for transient data so that the transaction log can be disabled for performance reasons. For instance, in one non-limiting example, the database individualization engine 110 can send an instruction to the database configuration setting controller 114 to change a data load transaction from "logging" mode to "no-logging" mode to allow shorter processing elapsed time.

The database checkpoints interval indicates/specifies an interval for the database system to flush modified in-memory data to persistent storage in order to shorten the recovery time. A longer interval can reduce the CPU and IO consumption for the checkpointing background job, and thus be used when database resources are needed for tenant workloads that require high performance, whereas a shorter interval can reduce the recovery time should the database crash and restart unexpectedly, and thus can be used when the tenant workload requires more strict Recovery-Time-Objective (RTO).

The resource allocation or throttle can be used to specify or indicate, for example, the maximum CPU cores or threads can be used for a transaction or a session, or the maximum memory can be allocated for a session, etc. The resource allocation or throttle can indicate, for example: CPU—count, utilization; IO—request per second (TOPS), throughput or bandwidth (MB per second); storage-space usage; memory—allocation for system processes and user processes, database cache size; processes—number of processes, parallelism, priority of the processes; app to DB connection pool size, etc.

The request rate throttle (rate limit) can be used to specify the maximum number of requests per second that is allowed to submit to database by the application servers to avoid saturation the database. An application will not submit requests to DB if the throttle rate is reached. The submission of requests to the database requests may be delayed or may be returned as errors by the application directly to the client. The request rate throttle (rate limit) can indicate, for example, a number or active sessions, application to database requests per second, etc. Can throttle or suspend suspicious activities (e.g., workload from Bots).

Referring again to FIG. 2B, in one embodiment, when dynamically changing one or more database configuration settings of the database 150-1 (at 214) does not satisfy workload scaling requirements for a given workload, then at 216, one or more auto-scaling processes 116, 118 can be invoked. The auto-scaling processes can automatically add one or more additional databases to the database system 130-1, as described above with reference to FIG. 1.

Another example of system parameters of the database system 130-1 that can be dynamically reconfigured at 210 is shown at 218-212. As noted above, if the query language pattern(s) associated with the detected database transaction cannot be automatically associated with a corresponding transaction category for that tenant 102-1 (at 204), then the detected database transaction can be flagged for further processing at 218-222.

At 218, for any detected database transaction that is not able to be categorized in a transaction category (at 204) by the application server or the database 150-1, the database individualization engine 110 can inspect the detected database transaction at 218.

At 220, the database individualization engine 110 can then send an instruction to the database monitoring controller 112 to set request rate alert and/or resource usage alert. Additionally, at 222, the database individualization engine 110 can send another instruction to the database configuration setting controller 114 to change, for example, one or more of: (1) a rate limit to throttle the transaction if a request rate alert is triggered, and/or (2) a resource usage limit to throttle the transaction if a resource usage alert is triggered.

As noted above, if the corresponding risk profile for that tenant 102-1 cannot be determined at 205 (e.g., it has not yet been created), then the method 200 can proceed as will now be described below with reference to FIG. 3.

Figure 3:
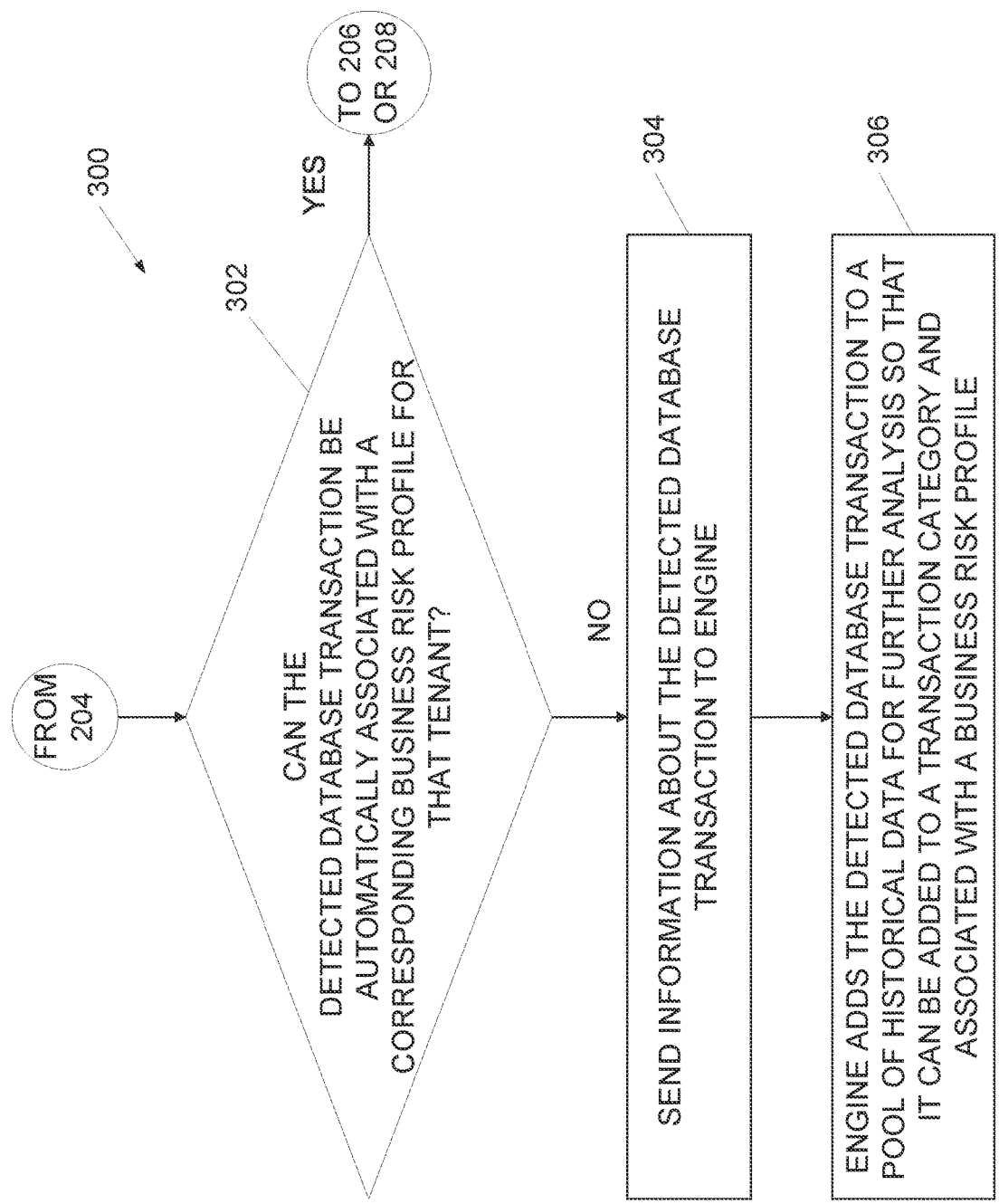
FIG. 3 is a flow chart that illustrates a method for creating a pool of database transactions to be categorized and associated with corresponding risk profiles in accordance with the disclosed embodiments.

FIG. 3 is a flow chart that illustrates a method 300 for creating a pool of database transactions to be categorized and associated with corresponding risk profiles in accordance with the disclosed embodiments.

At 302, it can be determined whether a database transaction (that was detected at 202 of FIG. 2A) can be automatically associated with a corresponding risk profile for that tenant 102-1. If so, the method 200 can proceed to either 206 or 208 of FIG. 2A depending on the implementation and where the determination is made (e.g., at the application server or at the database).

When it is determined at 302 that the one or more query language patterns from the detected database transaction cannot be automatically associated (at 205 of FIG. 2A) with a corresponding risk profile for that tenant 102-1, then the method 300 proceeds to 304, where the information about the detected database transaction can be sent to the engine 110. At 306, the database individualization engine 110 adds the detected database transaction to a pool of historical data for further analysis so that the detected database transaction can be added to a transaction category and/or associated with a risk profile corresponding to the transaction category.

To illustrate an example, if a database transaction is constructed directly at the database 150-1 with other tools or interfaces, the database 150-1 will also inspect the "risk profile" that is attached to the database transaction. However, if after the inspection (at 302), the application server and database cannot determine the transaction category of the transaction and cannot associate the risk profile, the database will send the information about the transaction to the engine 110 (at 304) and may proceed with the transaction processing with the default configurations and monitoring threshold. At 306, the engine 110 can add the transaction into the pool of historical data for analysis, and may report and notify analysts, and/or feed the info into an external system for machine learning and other analysis so that the database transaction can either be added into an existing transaction category or so that a new transaction category with new associated risk profile can be generated.

Figure 4:
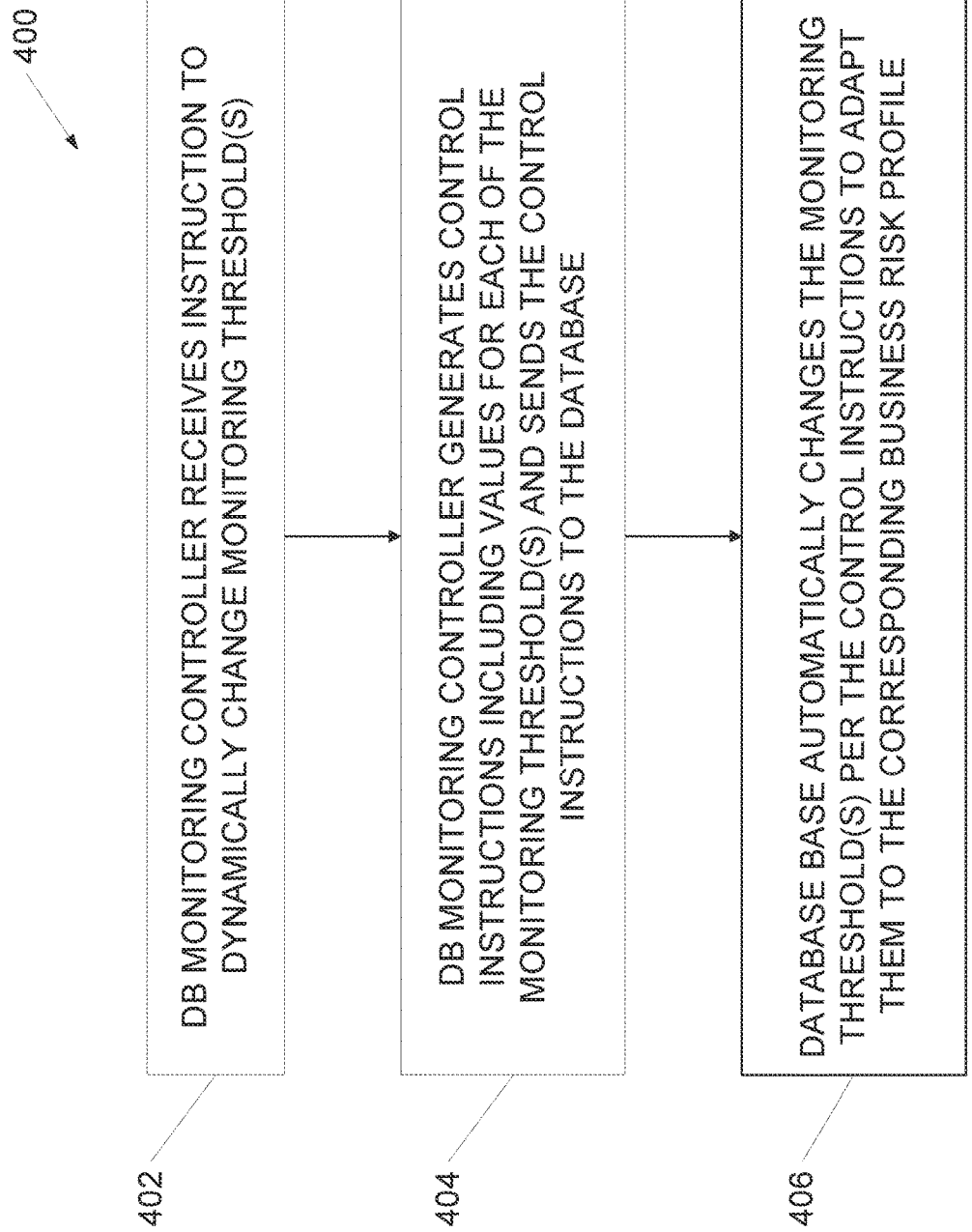
FIG. 4 is a flow chart that illustrates a method for dynamically adjusting monitoring and/or alerting thresholds in accordance with the disclosed embodiments.

FIG. 4 is a flow chart that illustrates a method 400 for dynamically adjusting monitoring and/or alerting thresholds in accordance with the disclosed embodiments. The method 400 can be used in one implementation of step 212 of FIG. 2B. The method 400 begins at 402, when the database monitoring controller 112 receives an instruction from the engine 110 to dynamically change one or more monitoring thresholds. Examples of the monitoring thresholds that can be automatically changed or adjusted can include, but are not limited to, any of the examples described above. In one embodiment, the instruction can explicitly include the monitoring threshold(s) that are to be changed and corresponding values that they are to be changed to. In another embodiment, the instruction can include an indication indicating which monitoring threshold(s) are to be changed and a corresponding risk profile, and the database monitoring controller 112 processes that information to generate values that each of the monitoring thresholds(s) are to be changed to.

In either embodiment, at 404, the database monitoring controller 112 generates control instructions for the database 150-1 and sends the control instructions to database 150-1 so that the database 150-1 can automatically change or adjust each of the monitoring thresholds(s) that are to be changed. The control instructions indicate the corresponding values that each of the monitoring thresholds(s) are to be changed to adapt them to the corresponding risk profile associated with the detected database transaction. At 406, the database 150-1 automatically changes or adjusts the monitoring threshold(s) per the control instructions to adapt them to the corresponding risk profile associated with the detected database transaction.

Figure 5:
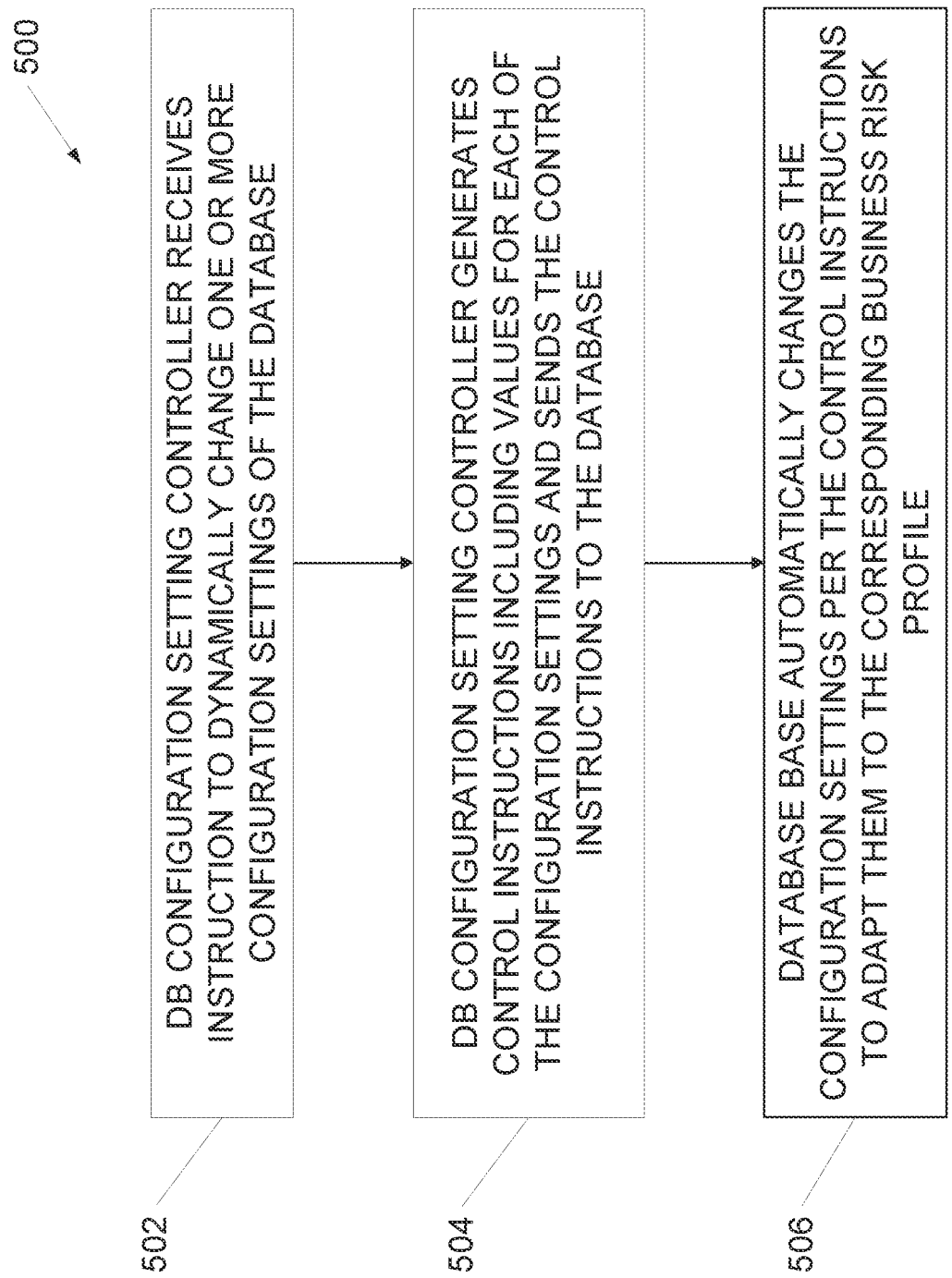
FIG. 5 is a flow chart that illustrates a method for dynamically changing database configuration settings in accordance with the disclosed embodiments.

FIG. 5 is a flow chart that illustrates a method 500 for dynamically changing database configuration settings in accordance with the disclosed embodiments. The method 500 can be used in one implementation of step 214 of FIG. 2B. The method 500 begins at 502, when the database configuration setting controller 114 receives an instruction from the engine 110 to dynamically change one or more database configuration settings. Examples of the database configuration settings that can be automatically changed or adjusted can include, but are not limited to, any of the examples described above. In one embodiment, the instruction can explicitly include the database configuration setting (s) that are to be changed and corresponding values that they are to be changed to. In another embodiment, the instruction can include an indication indicating which database configuration setting(s) are to be changed and a corresponding risk profile, and the database configuration setting controller 114 processes that information to generate values that each of the database configuration settings(s) are to be changed to.

In either embodiment, at 504, the database configuration setting controller 114 generates control instructions for the database 150-1 and sends the control instructions to database 150-1 of the database system 130-1 so that the database 150-1 can automatically change or adjust each of the database configuration setting(s) that are to be changed. The control instructions indicate the corresponding values that each of the database configuration settings(s) are to be changed to adapt them to the corresponding risk profile associated with the detected database transaction. At 506, the database 150-1 automatically changes or adjusts the database configuration setting(s) per the control instructions to adapt them to the corresponding risk profile associated with the detected database transaction.

Figure 6:
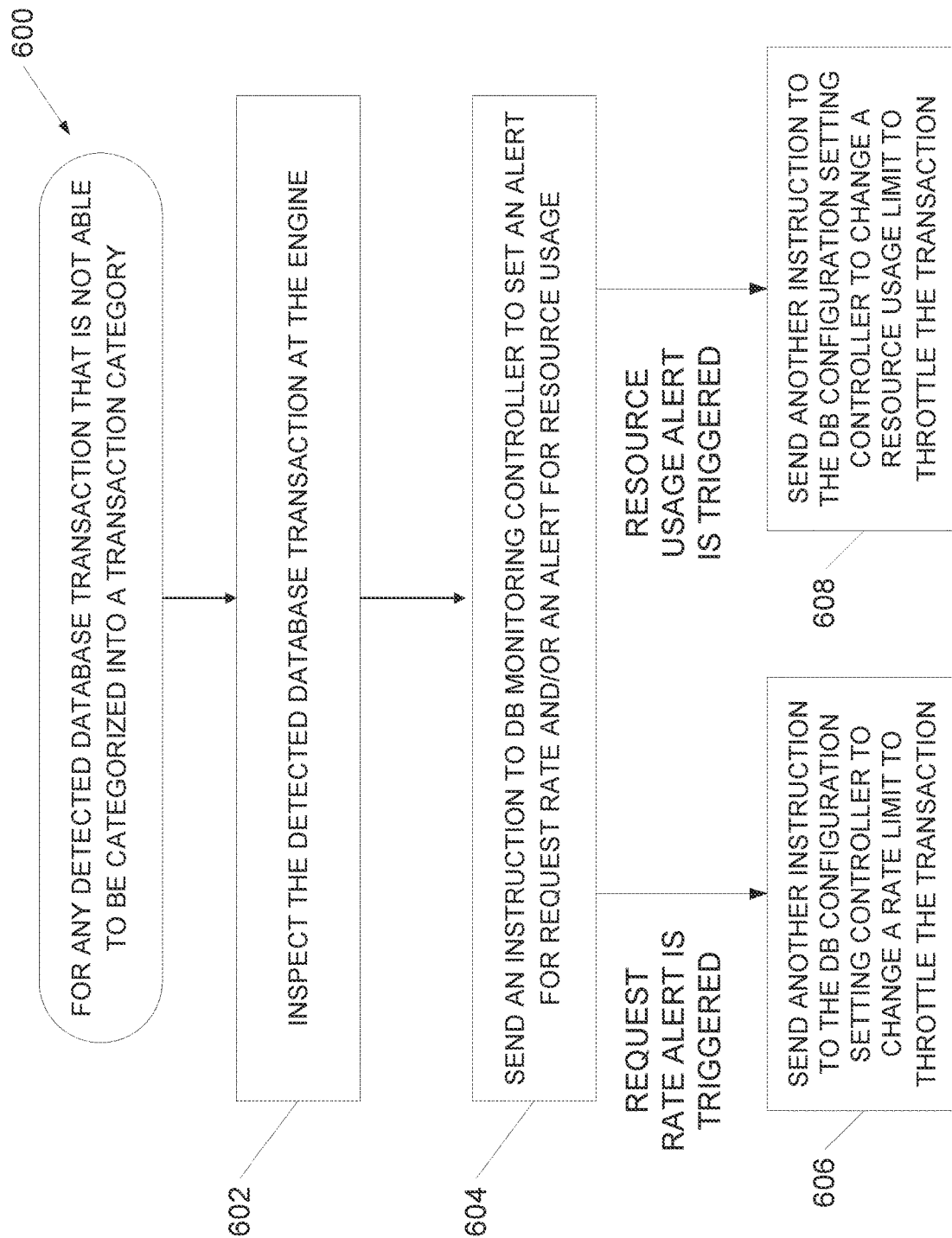
FIG. 6 is a flow chart that illustrates a method in accordance with the disclosed embodiments.

FIG. 6 is a flow chart that illustrates a method 600 in accordance with the disclosed embodiments. The method 600 can be used in one implementation of step 218 of FIG. 2B. At 602, the database individualization engine 110 can inspect any detected database transaction that has been flagged as not being to be categorized in a transaction category (at 204 of FIG. 2A). This can happen, for example, if the query language pattern(s) associated with the detected database transaction cannot be automatically associated with a corresponding transaction category for that tenant 102-1. At 604, the database individualization engine 110 can then send an instruction to the database monitoring controller 112 to set a request rate alert and/or a resource usage alert. If a request rate alert is triggered, then at 606, the database individualization engine 110 can send another instruction to the database configuration setting controller 114 to change, for example, a rate limit to throttle the transaction. If a resource usage alert is triggered, then at 608, the database individualization engine 110 can send another instruction to the database configuration setting controller 114 to change, for example, a resource usage limit to throttle the transaction.

FIG. 7 is an that illustrates three non-limiting examples of code for database transactions in accordance with the disclosed embodiments. Each transaction category 710 has an associated risk profile 730 for a particular tenant. Each transaction category 710 can have at least one query language pattern 720, and potentially many or multiple query language patterns 720. As described above, when a database transaction is detected, these query language patterns 720 can be analyzed (at the application server 140, the database 150, or the engine 110) to determine a transaction category 710 and the associated risk profile 730 for that transaction category. In Examples 1-3 that follow, it should be appreciated that these are non-limiting and provided for illustration purposes and that more attributes can be added to the metadata that describes query language patterns and associated risk profiles.

Example 1 illustrates a database transaction for a daily merchandise catalog data upload having a transaction category 710-1 (Merchandise Catalog Data Load). The transaction category 710-1 has an associated risk profile 730-1 for a particular tenant. In this example, the transaction category 710-1 can have four query language patterns 720-1 associated with it. When the daily merchandise catalog data upload is detected, these query language patterns 720-1 can be analyzed (at the application server 140, the database 150, or the engine 110) to determine the transaction category 710-1 and the associated risk profile 730-1 for that transaction category 710-1. The associated risk profile 730-1 indicates risk values for three non-limiting risk parameters, namely, data integrity having a value of low risk, performance having a value of high risk, and availability having a value of low risk.

Example 2 illustrates a database transaction for critical customer orders having a transaction category 710-2 (Customer Purchase Order). The transaction category 710-2 has an associated risk profile 730-2 for a particular tenant. In this example, the transaction category 710-2 can have two query language patterns 720-2 associated with it. When the critical customer order transaction is detected, these query language patterns 720-2 can be analyzed (at the application server 140, the database 150, or the engine 110) to determine the transaction category 710-2 and the associated risk profile 730-2 for that transaction category 710-2. The associated risk profile 730-2 indicates risk values for three non-limiting risk parameters, namely, data integrity having a value of high risk, performance having a value of mid risk, and availability having a value of high risk.

Example 3 illustrates a database transaction for a customer order invoice having a transaction category 710-3 (Customer Purchase Order Invoice). The transaction category 710-3 has an associated risk profile 730-3 for a particular tenant. In this example, the transaction category 710-3 can have three query language patterns 720-3 associated with it. When the customer order invoice transaction is detected, these query language patterns 720-3 can be analyzed (at the application server 140, the database 150, or the engine 110) to determine the transaction category 710-3 and the associated risk profile 730-3 for that transaction category 710-3. The associated risk profile 730-3 indicates risk values for three non-limiting risk parameters, namely, data integrity having a value of high risk, performance having a value of low risk, and availability having a value of low risk.

Non-limiting Examples of Dynamic Monitoring and Configuration Setting Changes with Different Risk Profiles A few simplified and non-limiting examples of instructions that could be generated by the database individualization engine 110 to cause actions to be taken to address risks under different risk scenarios will now be described. However, it should be appreciated that these are just a few simplified examples to provide context.

To address high data integrity risks, the database individualization engine 110 may provide instructions to the database monitoring controller 112 and the database configuration setting controller 114 to perform the following adjustments or changes: (1) lower the database replication lag monitoring threshold (e.g., from 5 mins to 30 seconds) for better data integrity in case of primary database 150-1-1 failures; (2) enable synchronous replication for critical transactions from a primary database 150-1-1 to a standby database 150-1-2, and (3) increase CPU utilization maximum threshold (e.g., from 50% to 80%) for critical transactions.

To address high availability risks, the database individualization engine 110 may provide instructions to the database monitoring controller 112 and the database configuration setting controller 114 to perform the following adjustments or changes: (1) lower the request throttling usage threshold (e.g., from 200 requests/second to 100 requests/second for this type of transaction) to ensure the compute, storage, and other resources are not saturated; (2) reduce the primary database 150-1-1 health-check monitoring interval (e.g., from 1 min to 30 seconds) and failure frequency (e.g., from three 1-min consecutive failures to two 30-second consecutive failures) to trigger the database failover from a primary database 150-1-1 to a standby database 150-1-2; and (3) increase the database checkpoint interval (e.g., from 5 mins to 1 min) to reduce the crash recovery time if the primary database 150-1-1 crashes and restarts.

To address high performance risks, the database individualization engine 110 may provide instructions to the database monitoring controller 112 and the database configuration setting controller 114 to perform the following adjustments or changes: (1) disable the transaction logging for non-critical transactions; (2) increase the CPU (utilization %, number of CPU cores) or 10 (10 per second, throughput, and bandwidth usage) usage and monitoring threshold. The database individualization engine 110 may also determine if there is a need to perform auto-scaling as described above.

The following description is of one example of a system in which the features described above may be implemented. The components of the system described below are merely one example and should not be construed as limiting. The cloud computing platform 100 described above with respect to FIGS. 1-7 may be implemented in any other type of computing environment, such as one with multiple servers, one with a single server, a multi-tenant server environment, a single-tenant server environment, or some combination of the above. Non-limiting examples of a cloud computing platform 100 will now be described with reference to FIGS. 8-11.

Figure 8:
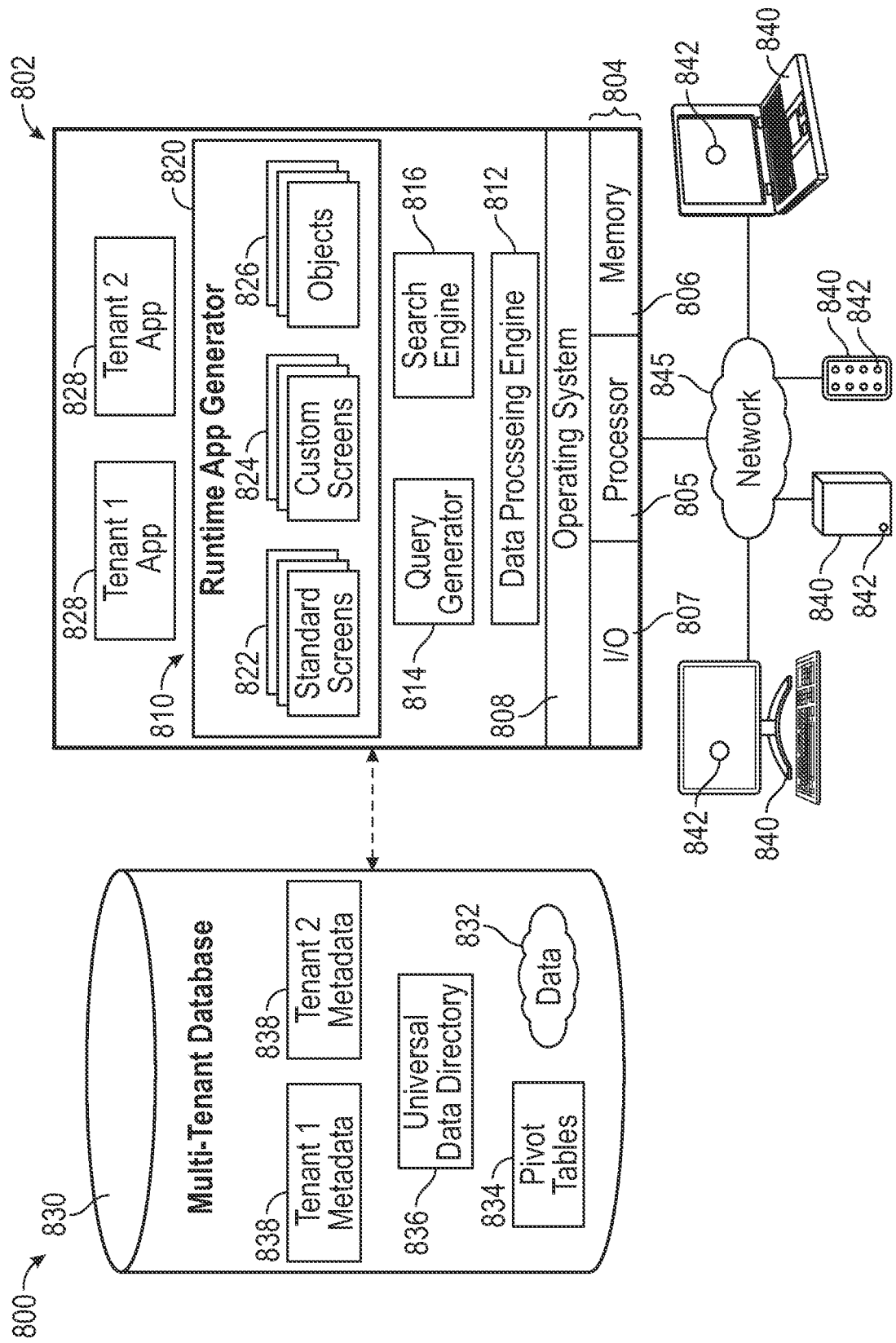
FIG. 8 is a schematic block diagram of an example of a multi-tenant computing environment in which features of the disclosed embodiments can be implemented in accordance with the disclosed embodiments.

FIG. 8 is a schematic block diagram of an example of a multi-tenant computing environment in which features of the disclosed embodiments can be implemented in accordance with the disclosed embodiments. As shown in FIG. 8, an exemplary cloud-based solution may be implemented in the context of a multi-tenant system 800 including a server 802 that supports applications 828 based upon data 832 from a database 830 that may be shared between multiple tenants, organizations, or enterprises, referred to herein as a multi-tenant database. Data and services generated by the various applications 828 are provided via a network 845 to any number of user systems 840, such as desktops, laptops, tablets, smartphones or other client devices, Google Glass™, and any other computing device implemented in an automobile, aircraft, television, or other business or consumer electronic device or system, including web clients.

Each application 828 is suitably generated at run-time (or on-demand) using a common application platform 810 that securely provides access to the data 832 in the database 830 for each of the various tenant organizations subscribing to the system 800. In accordance with one non-limiting example, the service cloud 800 is implemented in the form of an on-demand multi-tenant customer relationship management (CRM) system that can support any number of authenticated users for a plurality of tenants.

As used herein, a "tenant" or an "organization" should be understood as referring to a group of one or more users (typically employees) that shares access to common subset of the data within the multi-tenant database 830. In this regard, each tenant includes one or more users and/or groups associated with, authorized by, or otherwise belonging to that respective tenant. Stated another way, each respective user within the multi-tenant system 800 is associated with, assigned to, or otherwise belongs to a particular one of the plurality of enterprises supported by the system 800.

Each enterprise tenant may represent a company, corporate department, business, or legal organization, and/or any other entities that maintain data for particular sets of users (such as their respective employees or customers) within the multi-tenant system 800. Although multiple tenants may share access to the server 802 and the database 830, the particular data and services provided from the server 802 to each tenant can be securely isolated from those provided to other tenants. The multi-tenant architecture therefore allows different sets of users to share functionality and hardware resources without necessarily sharing any of the data 832 belonging to or otherwise associated with other organizations.

The multi-tenant database 830 may be a repository or other data storage system capable of storing and managing the data 832 associated with any number of tenant organizations. The database 830 may be implemented using conventional database server hardware. In various embodiments, the database 830 shares processing hardware 804 with the server 802. In other embodiments, the database 830 is implemented using separate physical and/or virtual database server hardware that communicates with the server 802 to perform the various functions described herein.

In an exemplary embodiment, the database 830 includes a database management system or other equivalent software capable of determining an optimal query plan for retrieving and providing a particular subset of the data 832 to an instance of application (or virtual application) 828 in response to a query initiated or otherwise provided by an application 828, as described in greater detail below. The multi-tenant database 830 may alternatively be referred to herein as an on-demand database, in that the database 830 provides (or is available to provide) data at run-time to on-demand virtual applications 828 generated by the application platform 810, as described in greater detail below.

In practice, the data 832 may be organized and formatted in any manner to support the application platform 810. In various embodiments, the data 832 is suitably organized into a relatively small number of large data tables to maintain a semi-amorphous "heap"-type format. The data 832 can then be organized as needed for a particular virtual application 828. In various embodiments, conventional data relationships are established using any number of pivot tables 834 that establish indexing, uniqueness, relationships between entities, and/or other aspects of conventional database organization as desired. Further data manipulation and report formatting is generally performed at run-time using a variety of metadata constructs. Metadata within a universal data directory (UDD) 836, for example, can be used to describe any number of forms, reports, workflows, user access privileges, business logic and other constructs that are common to multiple tenants.

Tenant-specific formatting, functions and other constructs may be maintained as tenant-specific metadata 838 for each tenant, as desired. Rather than forcing the data 832 into an inflexible global structure that is common to all tenants and applications, the database 830 is organized to be relatively amorphous, with the pivot tables 834 and the metadata 838 providing additional structure on an as-needed basis. To that end, the application platform 810 suitably uses the pivot tables 834 and/or the metadata 838 to generate "virtual" components of the virtual applications 828 to logically obtain, process, and present the relatively amorphous data 832 from the database 830.

The server 802 may be implemented using one or more actual and/or virtual computing systems that collectively provide the dynamic application platform 810 for generating the virtual applications 828. For example, the server 802 may be implemented using a cluster of actual and/or virtual servers operating in conjunction with each other, typically in association with conventional network communications, cluster management, load balancing and other features as appropriate. The server 802 operates with any sort of conventional processing hardware 804, such as a processor 805, memory 806, input/output features 807 and the like. The input/output features 807 generally represent the interface(s) to networks (e.g., to the network 845, or any other local area, wide area or other network), mass storage, display devices, data entry devices and/or the like.

The processor 805 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 806 represents any non-transitory short or long term storage or other computer-readable media capable of storing programming instructions for execution on the processor 805, including any sort of random access memory (RAM), read only memory (ROM), flash memory, magnetic or optical mass storage, and/or the like. The computer-executable programming instructions, when read and executed by the server 802 and/or processor 805, cause the server 802 and/or processor 805 to create, generate, or otherwise facilitate the application platform 810 and/or virtual applications 828 and perform one or more additional tasks, operations, functions, and/or processes described herein. It should be noted that the memory 806 represents one suitable implementation of such computer-readable media, and alternatively or additionally, the server 802 could receive and cooperate with external computer-readable media that is realized as a portable or mobile component or platform, e.g., a portable hard drive, a USB flash drive, an optical disc, or the like.

The application platform 810 is any sort of software application or other data processing engine that generates the virtual applications 828 that provide data and/or services to the user systems 840. In a typical embodiment, the application platform 810 gains access to processing resources, communications interfaces and other features of the processing hardware 804 using any sort of conventional or proprietary operating system 808. The virtual applications 828 are typically generated at run-time in response to input received from the user systems 840. For the illustrated embodiment, the application platform 810 includes a bulk data processing engine 812, a query generator 814, a search engine 816 that provides text indexing and other search functionality, and a runtime application generator 820. Each of these features may be implemented as a separate process or other module, and many equivalent embodiments could include different and/or additional features, components or other modules as desired.

The runtime application generator 820 dynamically builds and executes the virtual applications 828 in response to specific requests received from the user systems 840. The virtual applications 828 are typically constructed in accordance with the tenant-specific metadata 838, which describes the particular tables, reports, interfaces and/or other features of the particular application 828. In various embodiments, each virtual application 828 generates dynamic web content that can be served to a browser or other client program 842 associated with its user system 840, as appropriate.

The runtime application generator 820 suitably interacts with the query generator 814 to efficiently obtain multi-tenant data 832 from the database 830 as needed in response to input queries initiated or otherwise provided by users of the user systems 840. In a typical embodiment, the query generator 814 considers the identity of the user requesting a particular function (along with the user's associated tenant), and then builds and executes queries to the database 830 using system-wide metadata from the UDD 836, tenant specific metadata 838, pivot tables 834, and/or any other available resources. The query generator 814 in this example therefore maintains security of the common database 830 by ensuring that queries are consistent with access privileges granted to the user and/or tenant that initiated the request.

With continued reference to FIG. 8, the data processing engine 812 performs bulk processing operations on the data 832 such as uploads or downloads, updates, online transaction processing, and/or the like. In many embodiments, less urgent bulk processing of the data 832 can be scheduled to occur as processing resources become available, thereby giving priority to more urgent data processing by the query generator 814, the search engine 816, the virtual applications 828, etc.

In exemplary embodiments, the application platform 810 is utilized to create and/or generate data-driven virtual applications 828 for the tenants that they support. Such virtual applications 828 may make use of interface features such as custom (or tenant-specific) screens 824, standard (or universal) screens 822 or the like. Any number of custom and/or standard objects 826 may also be available for integration into tenant-developed virtual applications 828. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system.

The data 832 associated with each virtual application 828 is provided to the database 830, as appropriate, and stored until it is requested or is otherwise needed, along with the metadata 838 that describes the particular features (e.g., reports, tables, functions, objects, fields, formulas, code, etc.) of that particular virtual application 828. For example, a virtual application 828 may include a number of objects 826 accessible to a tenant, wherein for each object 826 accessible to the tenant, information pertaining to its object type along with values for various fields associated with that respective object type are maintained as metadata 838 in the database 830. In this regard, the object type defines the structure (e.g., the formatting, functions and other constructs) of each respective object 826 and the various fields associated therewith.

Still referring to FIG. 8, the data and services provided by the server 802 can be retrieved using any sort of personal computer, mobile telephone, tablet or other network-enabled user system 840 on the network 845. In an exemplary embodiment, the user system 840 includes a display device, such as a monitor, screen, or another conventional electronic display capable of graphically presenting data and/or information retrieved from the multi-tenant database 830, as described in greater detail below.

Typically, the user operates a conventional browser application or other client program 842 executed by the user system 840 to contact the server 802 via the network 845 using a networking protocol, such as the hypertext transport protocol (HTTP) or the like. The user typically authenticates his or her identity to the server 802 to obtain a session identifier ("SessionID") that identifies the user in subsequent communications with the server 802. When the identified user requests access to a virtual application 828, the runtime application generator 820 suitably creates the application at run time based upon the metadata 838, as appropriate. However, if a user chooses to manually upload an updated file (through either the web-based user interface or through an API), it will also be shared automatically with all of the users/devices that are designated for sharing.

As noted above, the virtual application 828 may contain Java, ActiveX, or other content that can be presented using conventional client software running on the user system 840; other embodiments may simply provide dynamic web or other content that can be presented and viewed by the user, as desired. As described in greater detail below, the query generator 814 suitably obtains the requested subsets of data 832 from the database 830 as needed to populate the tables, reports or other features of the particular virtual application 828. In various embodiments, application 828 embodies the functionality of a collaboration solution such as the Chatter system, described below.

Figure 9:
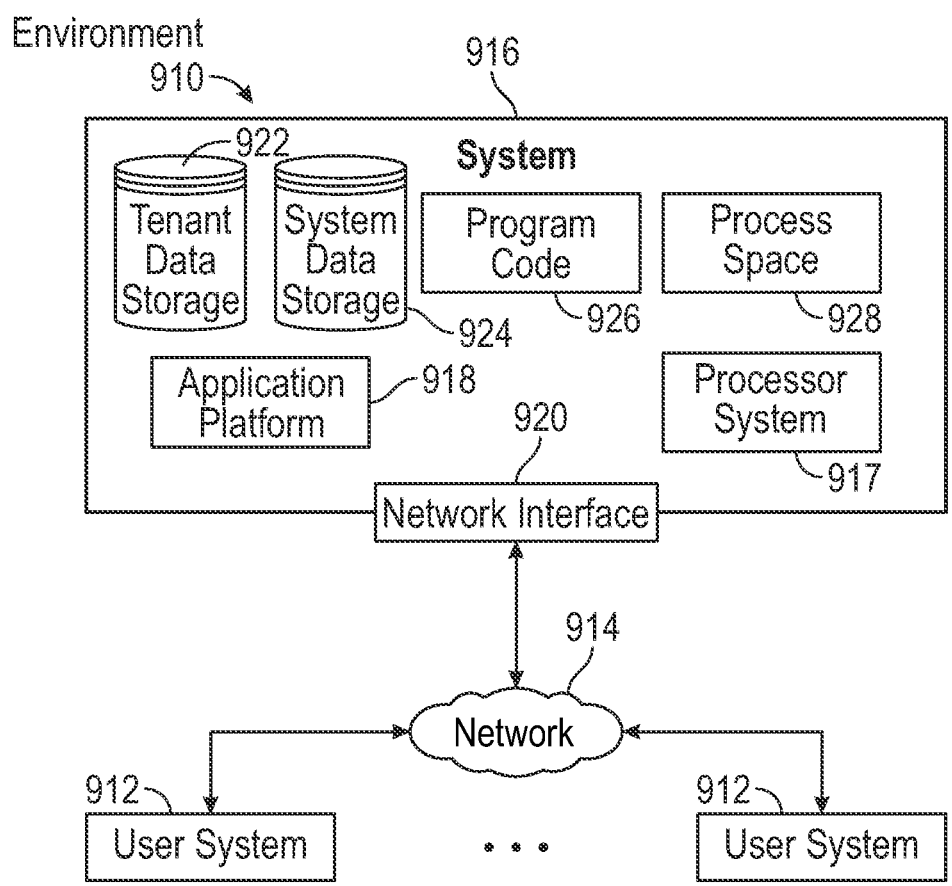
FIG. 9 shows a block diagram of an example of an environment in which an on-demand database service can be used in accordance with some implementations.

FIG. 9 shows a block diagram of an example of an environment 910 in which an on-demand database service can be used in accordance with some implementations. The environment 910 includes user systems 912, a network 914, a database system 916 (also referred to herein as a "cloud-based system"), a processor system 917, an application platform 918, a network interface 920, tenant database 922 for storing tenant data 923, system database 924 for storing system data 925, program code 926 for implementing various functions of the system 916, and process space 928 for executing database system processes and tenant-specific processes, such as running applications as part of an application hosting service. In some other implementations, environment 910 may not have all of these components or systems, or may have other components or systems instead of, or in addition to, those listed above.

In some implementations, the environment 910 is an environment in which an on-demand database service exists. An on-demand database service, such as that which can be implemented using the system 916, is a service that is made available to users outside of the enterprise(s) that own, maintain or provide access to the system 916. As described above, such users generally do not need to be concerned with building or maintaining the system 916. Instead, resources provided by the system 916 may be available for such users' use when the users need services provided by the system 916; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 918 can be a framework that allows the applications of system 916 to execute, such as the hardware or software infrastructure of the system 916. In some implementations, the application platform 918 enables the creation, management and execution of one or more applications developed by the provider of the on-demand database service, users accessing the on-demand database service via user systems 912, or third party application developers accessing the on-demand database service via user systems 912.

In some implementations, the system 916 implements a web-based customer relationship management (CRM) system. For example, in some such implementations, the system 916 includes application servers configured to implement and execute CRM software applications as well as provide related data, code, forms, renderable web pages and documents and other information to and from user systems 912 and to store to, and retrieve from, a database system related data, objects, and Web page content. In some MTS implementations, data for multiple tenants may be stored in the same physical database object in tenant database 922. In some such implementations, tenant data is arranged in the storage medium(s) of tenant database 922 so that data of one tenant is kept logically separate from that of other tenants so that one tenant does not have access to another tenant's data, unless such data is expressly shared. The system 916 also implements applications other than, or in addition to, a CRM application. For example, the system 916 can provide tenant access to multiple hosted (standard and custom) applications, including a CRM application. User (or third party developer) applications, which may or may not include CRM, may be supported by the application platform 918. The application platform 918 manages the creation and storage of the applications into one or more database objects and the execution of the applications in one or more virtual machines in the process space of the system 916.

According to some implementations, each system 916 is configured to provide web pages, forms, applications, data and media content to user (client) systems 912 to support the access by user systems 912 as tenants of system 916. As such, system 916 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 914 can be or include any network or combination of networks of systems or devices that communicate with one another. For example, the network 914 can be or include any one or any combination of a LAN (local area network), WAN (wide area network), telephone network, wireless network, cellular network, point-to-point network, star network, token ring network, hub network, or other appropriate configuration. The network 914 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 912 can communicate with system 916 using TCP/IP and, at a higher network level, other common Internet protocols to communicate, such as HTTP, FTP, AFS, WAP, etc. In an example where HTTP is used, each user system 912 can include an HTTP client commonly referred to as a "web browser" or simply a "browser" for sending and receiving HTTP signals to and from an HTTP server of the system 916. Such an HTTP server can be implemented as the sole network interface 920 between the system 916 and the network 914, but other techniques can be used in addition to or instead of these techniques. In some implementations, the network interface 920 between the system 916 and the network 914 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 912 can be implemented as any computing device(s) or other data processing apparatus or systems usable by users to access the database system 916. For example, any of user systems 912 can be a desktop computer, a workstation, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 912 typically executes an HTTP client, for example, a web browsing (or simply "browsing") program, such as a web browser based on the WebKit platform, Microsoft's Internet Explorer browser, Netscape's Navigator browser, Opera's browser, Mozilla's Firefox browser, or a WAP-enabled browser in the case of a cellular phone, PDA or other wireless device, or the like, allowing a user (for example, a subscriber of on-demand services provided by the system 916) of the user system 912 to access, process and view information, pages and applications available to it from the system 916 over the network 914.

Each user system 912 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 912 in conjunction with pages, forms, applications and other information provided by the system 916 or other systems or servers. For example, the user interface device can be used to access data and applications hosted by system 916, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 912 may differ in their respective capacities, and the capacity of a particular user system 912 can be entirely determined by permissions (permission levels) for the current user of such user system. For example, where a salesperson is using a particular user system 912 to interact with the system 916, that user system can have the capacities allotted to the salesperson. However, while an administrator is using that user system 912 to interact with the system 916, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 912 and some or all of its components are operator-configurable using applications, such as a browser, including computer code executed using a central processing unit (CPU) such as an Intel Pentium® processor or the like. Similarly, the system 916 (and additional instances of an MTS, where more than one is present) and all of its components can be operator-configurable using application(s) including computer code to run using the processor system 917, which may be implemented to include a CPU, which may include an Intel Pentium® processor or the like, or multiple CPUs.

The system 916 includes tangible computer-readable media having non-transitory instructions stored thereon/in that are executable by or used to program a server or other computing system (or collection of such servers or computing systems) to perform some of the implementation of processes described herein. For example, computer program code 926 can implement instructions for operating and configuring the system 916 to intercommunicate and to process web pages, applications and other data and media content as described herein. In some implementations, the computer code 926 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 10:
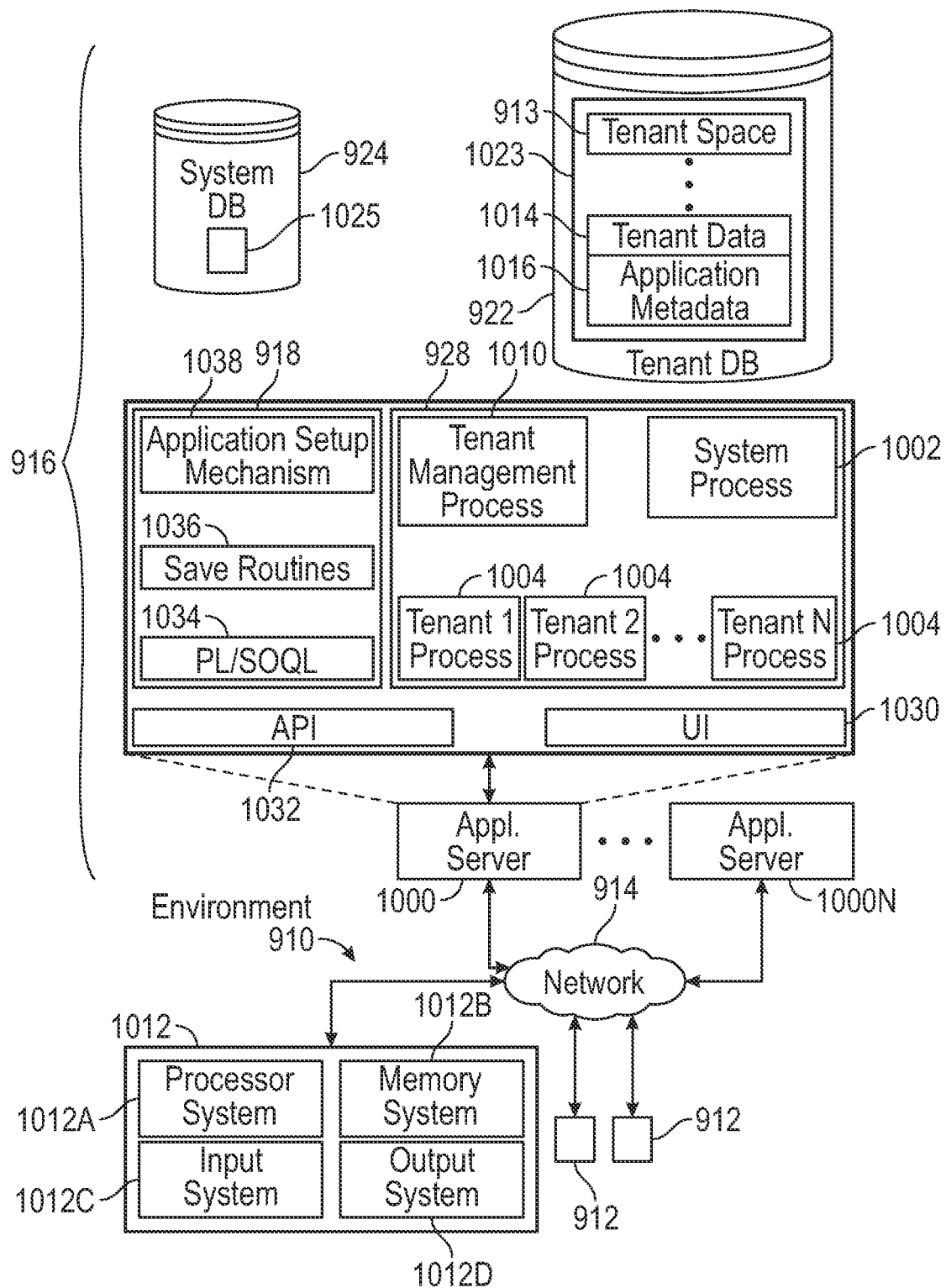
FIG. 10 shows a block diagram of example implementations of elements of FIG. 9 and example interconnections between these elements according to some implementations.

FIG. 10 shows a block diagram of example implementations of elements of FIG. 9 and example interconnections between these elements according to some implementations. That is, FIG. 10 also illustrates environment 910, but FIG. 10, various elements of the system 916 and various interconnections between such elements are shown with more specificity according to some more specific implementations. Elements from FIG. 9 that are also shown in FIG. 10 will use the same reference numbers in FIG. 10 as were used in FIG. 9. Additionally, in FIG. 10, the user system 912 includes a processor system 1012A, a memory system 1012B, an input system 1012C, and an output system 1012D. The processor system 1012A can include any suitable combination of one or more processors. The memory system 1012B can include any suitable combination of one or more memory devices. The input system 1012C can include any suitable combination of input devices, such as one or more touchscreen interfaces, keyboards, mice, trackballs, scanners, cameras, or interfaces to networks. The output system 1012D can include any suitable combination of output devices, such as one or more display devices, printers, or interfaces to networks.

In FIG. 10, the network interface 920 of FIG. 9 is implemented as a set of HTTP application servers 10001-1000N. Each application server 1000, also referred to herein as an "app server," is configured to communicate with tenant database 922 and the tenant data 1023 therein, as well as system database 924 and the system data 1025 therein, to serve requests received from the user systems 1012. The tenant data 1023 can be divided into individual tenant storage spaces 1013, which can be physically or logically arranged or divided. Within each tenant storage space 1013, tenant data 1014 and application metadata 1016 can similarly be allocated for each user. For example, a copy of a user's most recently used (MRU) items can be stored to user storage 1014. Similarly, a copy of MRU items for an entire organization that is a tenant can be stored to tenant storage space 1013.

The process space 928 includes system process space 1002, individual tenant process spaces 1004 and a tenant management process space 1010. The application platform 918 includes an application setup mechanism 1038 that supports application developers' creation and management of applications. Such applications and others can be saved as metadata into tenant database 922 by save routines 1036 for execution by subscribers as one or more tenant process spaces 1004 managed by tenant management process 1010, for example. Invocations to such applications can be coded using PL/SOQL 1034, which provides a programming language style interface extension to API 1032. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 816 for the subscriber making the invocation and executing the metadata as an application in a virtual machine.

The system 916 of FIG. 10 also includes a user interface (UI) 1030 and an application programming interface (API) 1032 to system 916 resident processes to users or developers at user systems 1012. In some other implementations, the environment 910 may not have the same elements as those listed above or may have other elements instead of, or in addition to, those listed above.

Each application server 1000 can be communicably coupled with tenant database 922 and system database 924, for example, having access to tenant data 1023 and system data 1025, respectively, via a different network connection. For example, one application server 10001 can be coupled via the network 914 (for example, the Internet), another application server 1000N can be coupled via a direct network link, and another application server (not illustrated) can be coupled by yet a different network connection. Transfer Control Protocol and Internet Protocol (TCP/IP) are examples of typical protocols that can be used for communicating between application servers 1000 and the system 916. However, it will be apparent to one skilled in the art that other transport protocols can be used to optimize the system 916 depending on the network interconnections used.

In some implementations, each application server 1000 is configured to handle requests for any user associated with any organization that is a tenant of the system 916. Because it can be desirable to be able to add and remove application servers 1000 from the server pool at any time and for various reasons, in some implementations there is no server affinity for a user or organization to a specific application server 1000. In some such implementations, an interface system implementing a load balancing function (for example, an F5 Big-IP load balancer) is communicably coupled between the application servers 1000 and the user systems 1012 to distribute requests to the application servers 1000. In one implementation, the load balancer uses a least-connections algorithm to route user requests to the application servers 1000. Other examples of load balancing algorithms, such as round robin and observed-response-time, also can be used. For example, in some instances, three consecutive requests from the same user could hit three different application servers 1000, and three requests from different users could hit the same application server 1000. In this manner, by way of example, system 916 can be a multi-tenant system in which system 916 handles storage of, and access to, different objects, data and applications across disparate users and organizations.

In one example storage use case, one tenant can be a company that employs a sales force where each salesperson uses system 916 to manage aspects of their sales. A user can maintain contact data, leads data, customer follow-up data, performance data, goals and progress data, etc., all applicable to that user's personal sales process (for example, in tenant database 922). In an example of a MTS arrangement, because all of the data and the applications to access, view, modify, report, transmit, calculate, etc., can be maintained and accessed by a user system 1012 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 916 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 916 also can maintain system level data usable by multiple tenants or other data. Such system level data can include industry reports, news, postings, and the like that are sharable among tenants.

In some implementations, the user systems 1012 (which also can be client systems) communicate with the application servers 1000 to request and update system-level and tenant-level data from the system 916. Such requests and updates can involve sending one or more queries to tenant database 922 or system database 924. The system 916 (for example, an application server 1000 in the system 916) can automatically generate one or more SQL statements (for example, one or more SQL queries) designed to access the desired information. System database 924 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 11A:
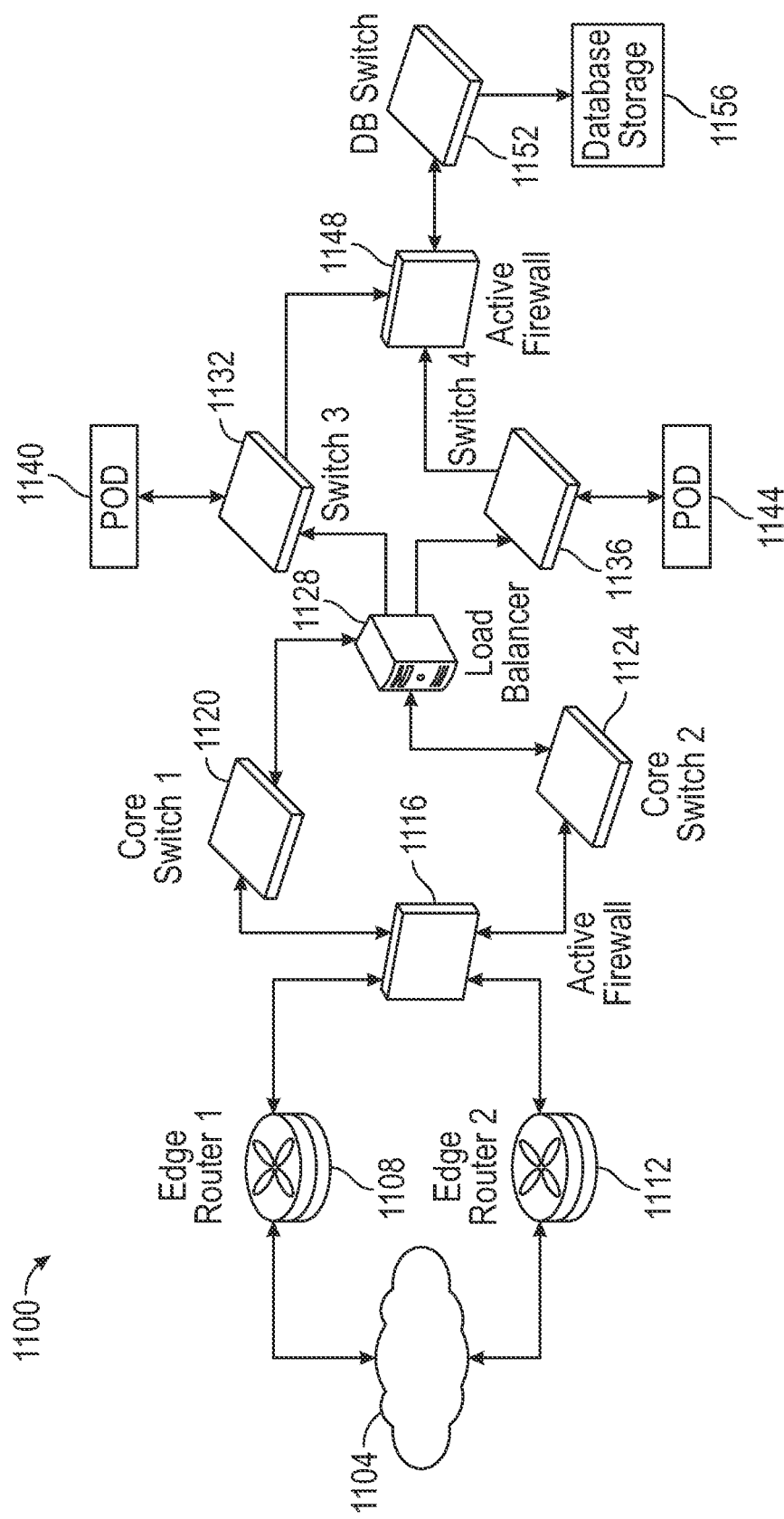
FIG. 11A shows a system diagram illustrating example architectural components of an on-demand database service environment according to some implementations.

FIG. 11A shows a system diagram illustrating example architectural components of an on-demand database service environment 1100 according to some implementations. A client machine communicably connected with the cloud 1104, generally referring to one or more networks in combination, as described herein, can communicate with the on-demand database service environment 1100 via one or more edge routers 1108 and 1112. A client machine can be any of the examples of user systems 12 described above. The edge routers can communicate with one or more core switches 1120 and 1124 through a firewall 1116. The core switches can communicate with a load balancer 1128, which can distribute server load over different pods, such as the pods 1140 and 1144. The pods 1140 and 1144, which can each include one or more servers or other computing resources, can perform data processing and other operations used to provide on-demand services. Communication with the pods can be conducted via pod switches 1132 and 1136. Components of the on-demand database service environment can communicate with database storage 1156 through a database firewall 1148 and a database switch 1152.

Figure 11B:
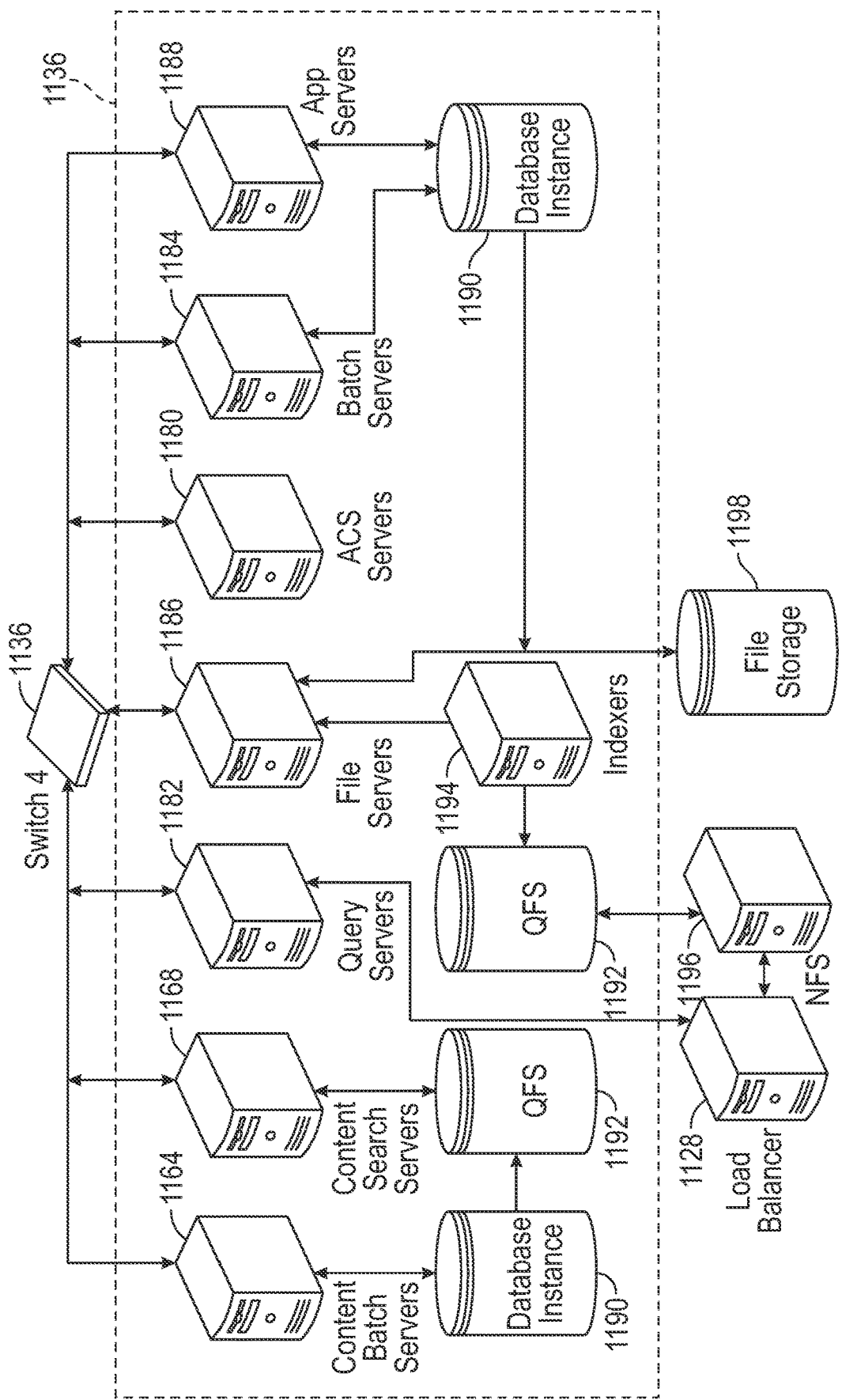
FIG. 11B shows a system diagram further illustrating example architectural components of an on-demand database service environment according to some implementations.

As shown in FIGS. 11A and 11B, accessing an on-demand database service environment can involve communications transmitted among a variety of different hardware or software components. Further, the on-demand database service environment 1100 is a simplified representation of an actual on-demand database service environment. For example, while only one or two devices of each type are shown in FIGS. 11A and 11B, some implementations of an on-demand database service environment can include anywhere from one to several devices of each type. Also, the on-demand database service environment need not include each device shown in FIGS. 11A and 11B or can include additional devices not shown in FIGS. 11A and 11B.

Additionally, it should be appreciated that one or more of the devices in the on-demand database service environment 1100 can be implemented on the same physical device or on different hardware. Some devices can be implemented using hardware or a combination of hardware and software. Thus, terms such as "data processing apparatus," "machine," "server" and "device" as used herein are not limited to a single hardware device, rather references to these terms can include any suitable combination of hardware and software configured to provide the described functionality.

The cloud 1104 is intended to refer to a data network or multiple data networks, often including the Internet. Client machines communicably connected with the cloud 1104 can communicate with other components of the on-demand database service environment 1100 to access services provided by the on-demand database service environment. For example, client machines can access the on-demand database service environment to retrieve, store, edit, or process information. In some implementations, the edge routers 1108 and 1112 route packets between the cloud 1104 and other components of the on-demand database service environment 1100. For example, the edge routers 1108 and 1112 can employ the Border Gateway Protocol (BGP). The BGP is the core routing protocol of the Internet. The edge routers 1108 and 1112 can maintain a table of IP networks or 'prefixes', which designate network reachability among autonomous systems on the Internet.

In some implementations, the firewall 1116 can protect the inner components of the on-demand database service environment 1100 from Internet traffic. The firewall 1116 can block, permit, or deny access to the inner components of the on-demand database service environment 1100 based upon a set of rules and other criteria. The firewall 1116 can act as one or more of a packet filter, an application gateway, a stateful filter, a proxy server, or any other type of firewall.

In some implementations, the core switches 1120 and 1124 are high-capacity switches that transfer packets within the on-demand database service environment 1100. The core switches 1120 and 1124 can be configured as network bridges that quickly route data between different components within the on-demand database service environment. In some implementations, the use of two or more core switches 1120 and 1124 can provide redundancy or reduced latency.

In some implementations, the pods 1140 and 1144 perform the core data processing and service functions provided by the on-demand database service environment. Each pod can include various types of hardware or software computing resources. An example of the pod architecture is discussed in greater detail with reference to FIG. 11 DDDD. In some implementations, communication between the pods 1140 and 1144 is conducted via the pod switches 1132 and 1136. The pod switches 1132 and 1136 can facilitate communication between the pods 1140 and 1144 and client machines communicably connected with the cloud 1104, for example via core switches 1120 and 1124. Also, the pod switches 1132 and 1136 may facilitate communication between the pods 1140 and 1144 and the database storage 1156. In some implementations, the load balancer 1128 can distribute workload between the pods 1140 and 1144. Balancing the on-demand service requests between the pods can assist in improving the use of resources, increasing throughput, reducing response times, or reducing overhead. The load balancer 1128 may include multilayer switches to analyze and forward traffic.

In some implementations, access to the database storage 1156 is guarded by a database firewall 1148. The database firewall 1148 can act as a computer application firewall operating at the database application layer of a protocol stack. The database firewall 1148 can protect the database storage 1156 from application attacks such as structure query language (SQL) injection, database rootkits, and unauthorized information disclosure. In some implementations, the database firewall 1148 includes a host using one or more forms of reverse proxy services to proxy traffic before passing it to a gateway router. The database firewall 1148 can inspect the contents of database traffic and block certain content or database requests. The database firewall 1148 can work on the SQL application level atop the TCP/IP stack, managing applications' connection to the database or SQL management interfaces as well as intercepting and enforcing packets traveling to or from a database network or application interface.

In some implementations, communication with the database storage 1156 is conducted via the database switch 1152. The multi-tenant database storage 1156 can include more than one hardware or software components for handling database queries. Accordingly, the database switch 1152 can direct database queries transmitted by other components of the on-demand database service environment (for example, the pods 1140 and 1144) to the correct components within the database storage 1156. In some implementations, the database storage 1156 is an on-demand database system shared by many different organizations as described above with reference to FIG. 1, FIG. 9 and FIG. 10.

FIG. 11B shows a system diagram further illustrating example architectural components of an on-demand database service environment according to some implementations. The pod 1144 can be used to render services to a user of the on-demand database service environment 1100. In some implementations, each pod includes a variety of servers or other systems. The pod 1144 includes one or more content batch servers 1164, content search servers 1168, query servers 1182, file force servers 1186, access control system (ACS) servers 1180, batch servers 1184, and app servers 1188. The pod 1144 also can include database instances 1190, quick file systems (QFS) 1192, and indexers 1194. In some implementations, some or all communication between the servers in the pod 1144 can be transmitted via the switch 1136.

In some implementations, the app servers 1188 include a hardware or software framework dedicated to the execution of procedures (for example, programs, routines, scripts) for supporting the construction of applications provided by the on-demand database service environment 1100 via the pod 1144. In some implementations, the hardware or software framework of an app server 1188 is configured to execute operations of the services described herein, including performance of the blocks of various methods or processes described herein. In some alternative implementations, two or more app servers 1188 can be included and cooperate to perform such methods, or one or more other servers described herein can be configured to perform the disclosed methods.

The content batch servers 1164 can handle requests internal to the pod. Some such requests can be long-running or not tied to a particular customer. For example, the content batch servers 1164 can handle requests related to log mining, cleanup work, and maintenance tasks. The content search servers 1168 can provide query and indexer functions. For example, the functions provided by the content search servers 1168 can allow users to search through content stored in the on-demand database service environment. The file force servers 1186 can manage requests for information stored in the File force storage 1198. The File force storage 1198 can store information such as documents, images, and basic large objects (BLOBs). By managing requests for information using the file force servers 1186, the image footprint on the database can be reduced. The query servers 1182 can be used to retrieve information from one or more file storage systems. For example, the query system 1182 can receive requests for information from the app servers 1188 and transmit information queries to the NFS 1196 located outside the pod.

The pod 1144 can share a database instance 1190 configured as a multi-tenant environment in which different organizations share access to the same database. Additionally, services rendered by the pod 1144 may call upon various hardware or software resources. In some implementations, the ACS servers 1180 control access to data, hardware resources, or software resources. In some implementations, the batch servers 1184 process batch jobs, which are used to run tasks at specified times. For example, the batch servers 1184 can transmit instructions to other servers, such as the app servers 1188, to trigger the batch jobs.

In some implementations, the QFS 1192 is an open-source file storage system available from Sun Microsystems® of Santa Clara, California The QFS can serve as a rapid-access file storage system for storing and accessing information available within the pod 1144. The QFS 1192 can support some volume management capabilities, allowing many disks to be grouped together into a file storage system. File storage system metadata can be kept on a separate set of disks, which can be useful for streaming applications where long disk seeks cannot be tolerated. Thus, the QFS system can communicate with one or more content search servers 1168 or indexers 1194 to identify, retrieve, move, or update data stored in the network file storage systems 1196 or other storage systems.

In some implementations, one or more query servers 1182 communicate with the NFS 1196 to retrieve or update information stored outside of the pod 1144. The NFS 1196 can allow servers located in the pod 1144 to access information to access files over a network in a manner similar to how local storage is accessed. In some implementations, queries from the query servers 1182 are transmitted to the NFS 1196 via the load balancer 1128, which can distribute resource requests over various resources available in the on-demand database service environment. The NFS 1196 also can communicate with the QFS 1192 to update the information stored on the NFS 1196 or to provide information to the QFS 1192 for use by servers located within the pod 1144.

In some implementations, the pod includes one or more database instances 1190. The database instance 1190 can transmit information to the QFS 1192. When information is transmitted to the QFS, it can be available for use by servers within the pod 1144 without using an additional database call. In some implementations, database information is transmitted to the indexer 1194. Indexer 1194 can provide an index of information available in the database 1190 or QFS 1192. The index information can be provided to file force servers 1186 or the QFS 1192.

Figure 12:
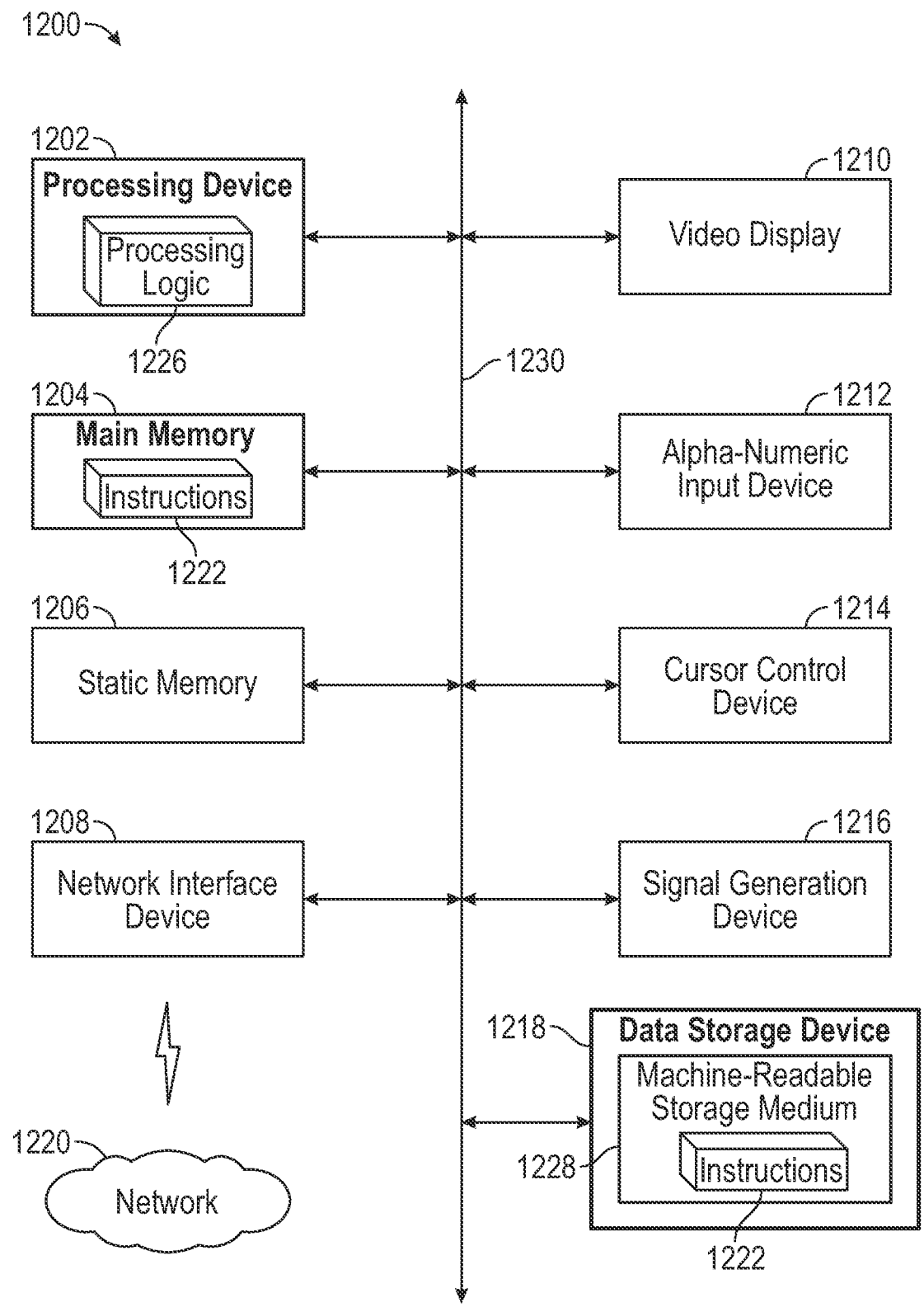
FIG. 12 is a block diagram that illustrates a diagrammatic representation of a machine in the exemplary form of a computer system within which a set of instructions, for causing the machine to perform any one or more of the methodologies discussed herein, may be executed.

FIG. 12 illustrates a diagrammatic representation of a machine in the exemplary form of a computer system 1200 within which a set of instructions, for causing the machine to perform any one or more of the methodologies discussed herein, may be executed. The system 1200 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 1200 can be used to implement any of the blocks, components or entities shown in FIG. 1.

The exemplary computer system 1200 includes a processing device or system (processor) 1202, a main memory 1204 (e.g., read-only memory (ROM), flash memory, dynamic random access memory (DRAM) such as synchronous DRAM (SDRAM)), a static memory 1206 (e.g., flash memory, static random access memory (SRAM)), and a data storage device 1218, which communicate with each other via a bus 1230.

Processing device 1202 represents one or more general-purpose processing devices such as a microprocessor, central processing unit, or the like. More particularly, the processing device 1202 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1202 may also be one or more special-purpose processing devices such as an application specific integrated circuit (ASIC), a field programmable gate array (FPGA), a digital signal processor (DSP), network processor, or the like.

The computer system 1200 may further include a network interface device 1208. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), and a signal generation device 1216 (e.g., a speaker).

The data storage device 1218 may include a computer-readable medium 1228 on which is stored one or more sets of instructions 1222 (e.g., instructions of in-memory buffer service 114) embodying any one or more of the methodologies or functions described herein. The instructions 1222 may also reside, completely or at least partially, within the main memory 1204 and/or within processing logic 1226 of the processing device 1202 during execution thereof by the computer system 1200, the main memory 1204 and the processing device 1202 also constituting computer-readable media. The instructions may further be transmitted or received over a network 1220 via the network interface device 1208.

While the computer-readable storage medium 1228 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Various acts are described herein in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining," "analyzing," "identifying," "adding," "displaying," "generating," "querying," "creating," "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes (e.g., a special-purpose computer), or it may comprise a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose or special-purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for dynamically reconfiguring a database system of a tenant based on one or more risk profiles of the tenant, wherein the database system of the tenant comprises at least one database of the tenant, the method comprising:
   in response to a request received from a client of the tenant: automatically detecting a database transaction based on the request, the request comprising a query submitted to the database system or an application programming interface (API) invoked at the database system, wherein the detected database transaction has one or more query language patterns;
   analyzing the one or more query language patterns associated with the detected database transaction to automatically associate the detected database transaction with a corresponding transaction category of a plurality of transaction categories for that tenant when the one or more query language patterns are associated with the corresponding transaction category of the plurality of transaction categories, the corresponding transaction category of the plurality of transaction categories having at least one query language pattern associated therewith:
   when the detected database transaction is not associated with the corresponding transaction category:
      inspecting the detected database transaction; and
      sending an instruction to a database monitoring and alerting system to set at least one of a request rate alert and a resource usage alert;
   when the detected database transaction is associated with the corresponding transaction category:
      determining a corresponding risk profile based on input data for that tenant based on the corresponding transaction category, wherein each transaction category of the plurality of transaction categories has an associated risk profile for that tenant; and
   dynamically reconfiguring a monitoring threshold of the database system based on the corresponding risk profile to allow the detected database transaction to proceed without triggering an alert based on the corresponding risk profile.

2. The method according to claim 1, wherein the step of dynamically reconfiguring comprises:
   dynamically changing, via a database configuration management system based on the corresponding risk profile associated with the detected database transaction, one or more database configuration settings of the database to adapt them to the corresponding risk profile associated with the detected database transaction.

3. The method according to claim 2, wherein the one or more database configuration settings of the database comprise one or more of: database replication mode; database transaction logging mode; database checkpoints interval: resource allocation or throttle; and request rate throttle.

4. The method according to claim 2, wherein the step of the step of dynamically reconfiguring further comprises:
   when dynamically changing the one or more database configuration settings does not satisfy workload scaling requirements: invoking an auto-scaling process to add one or more additional databases and scale out read operations and/or write operations of the database to the one or more additional databases.

5. The method according to claim 1, wherein the database system of the tenant further comprises at least one application server of the tenant, and wherein the step of automatically detecting at least one database transaction, comprises:
   invoking an application programming interface at the at least one application server in response to the request; and
   automatically detecting at least one database transaction at the at least one application server based on the application programming interface invoked at the at least one application server; and
   the method further comprising:
   sending the detected database transaction with the corresponding risk profile from the at least one application server to the database.

6. The method according to claim 1, wherein the database system of the tenant further comprises at least one application server of the tenant, and wherein the step of automatically detecting at least one database transaction, comprises:
   invoking an application programming interface at the at least one application server, in response to the request, to generate one or more queries; and
   automatically detecting at least one database transaction at the database based on the one or more queries submitted to the database.

7. The method according to claim 1, wherein the database system of the tenant further comprises at least one application server of the tenant, and wherein the step of dynamically reconfiguring further comprises:
   for any detected database transaction that is not able to be categorized in a transaction category by the at least one application server or the database:
      sending another instruction to a database configuration management system to change one or more of:
         (1) a rate limit to throttle the detected database transaction if the request rate alert is triggered; and
         (2) a resource usage limit to throttle the detected database transaction if the resource usage alert is triggered.

8. The method according to claim 1, wherein the input data comprises one or more of:
- historical database usage patterns of the tenant comprising: historical workload and transaction data for the tenant;
- planned upcoming events of the tenant;
- planned application features of the tenant; and
- feeds from other systems.

9. The method according to claim 1, wherein the method further comprises:
- adding the detected database transaction to a pool of historical data for further analysis when the one or more query language patterns from the detected database transaction cannot be automatically associated with the corresponding risk profile for that tenant so that the detected database transaction can be added to a transaction category and associated with a risk profile.

10. The method according to claim 1, wherein the monitoring threshold comprises one of:
- a database replication lag threshold;
- a central processing unit (CPU) utilization threshold;
- an input-output (IO) latency and throughput threshold:
- a storage space usage threshold;
- a request rate threshold;
- a network bandwidth threshold;
- a database request response time threshold;
- a database request error rate threshold;
- a database connection pool size threshold; and
- a database process threshold.

11. A system for dynamically reconfiguring a database system of a tenant based on one or more risk profiles of the tenant, wherein the database system of the tenant comprises at least one database of the tenant, the system comprising:
- at least one hardware-based processor and memory, wherein the memory comprises processor-executable instructions encoded on a non-transient processor-readable media, wherein the processor-executable instructions, when executed by the at least one hardware-based processor, are configurable to cause:
  - in response to a request received from a client of the tenant: automatically detecting a database transaction based on the request, the request comprising a query submitted to the database system or an application programming interface (API) invoked at the database system, wherein the detected database transaction has one or more query language patterns;
  - analyzing the one or more query language patterns associated with the detected database transaction to automatically associate the detected database transaction with a corresponding transaction category of a plurality of transaction categories for that tenant when the one or more query language patterns are associated with the corresponding transaction category of the plurality of transaction categories, the corresponding transaction category of the plurality of transaction categories having at least one query language pattern associated therewith;
  - when the detected database transaction is not associated with the corresponding transaction category:
    - inspecting the detected database transaction; and
    - sending an instruction to a database monitoring and alerting system to set at least one of a request rate alert and a resource usage alert;
  - when the detected database transaction is associated with the corresponding transaction category:
    - determining a corresponding risk profile based on input data for that tenant based on the corresponding transaction category, wherein each transaction category of the plurality of transaction categories has an associated risk profile for that tenant; and
    - dynamically reconfiguring a monitoring threshold of the database system based on the corresponding risk profile to allow the detected database transaction to proceed without triggering an alert based on the corresponding risk profile.

12. The system according to claim 11, wherein the step of dynamically reconfiguring comprises:
- dynamically changing, via a database configuration management system based on the corresponding risk profile associated with the detected database transaction, one or more database configuration settings of the database to adapt them to the corresponding risk profile associated with the detected database transaction.

13. The system according to claim 12, wherein the step of the step of dynamically reconfiguring further comprises:
- when dynamically changing the one or more database configuration settings does not satisfy workload scaling requirements:
- invoking an auto-scaling process to add one or more additional databases and scale out read operations and/or write operations of the database to the one or more additional databases.

14. The system according to claim 11, wherein the database system of the tenant further comprises at least one application server of the tenant, and wherein the step of automatically detecting at least one database transaction, comprises:
- invoking an application programming interface at the at least one application server in response to the request; and
- automatically detecting at least one database transaction at the at least one application server based on the application programming interface invoked at the at least one application server; and
- the method further comprising:
  - sending the detected database transaction with the corresponding risk profile from the at least one application server to the database.

15. The system according to claim 11, wherein the database system of the tenant further comprises at least one application server of the tenant, and wherein the step of automatically detecting at least one database transaction, comprises:
- invoking an application programming interface at the at least one application server, in response to the request, to generate one or more queries; and
- automatically detecting at least one database transaction at the database based on the one or more queries submitted to the database.

16. The system according to claim 11, wherein the step of dynamically reconfiguring comprises:
- dynamically adjusting, via the database monitoring and alerting system based on the corresponding risk profile associated with the detected database transaction, one or more monitoring thresholds to adapt them to the corresponding risk profile associated with the detected database transaction.

17. The system according to claim 11, wherein the database system of the tenant further comprises at least one application server of the tenant, and wherein the step of dynamically reconfiguring further comprises:

for any detected database transaction that is not able to be categorized in a transaction category by the at least one application server or the database:
sending another instruction to a database configuration management system to change one or more of:
(1) a rate limit to throttle the detected database transaction if the request rate alert is triggered; and
(2) a resource usage limit to throttle the detected database transaction if the resource usage alert is triggered.

18. The system according to claim 11, wherein the input data comprises one or more of:
historical database usage patterns of the tenant comprising: historical workload and transaction data for the tenant;
planned upcoming events of the tenant;
planned application features of the tenant; and
feeds from other systems.

19. At least one non-transient computer-readable medium having instructions stored thereon that are configurable to cause at least one processor to perform a method for dynamically reconfiguring a database system of a tenant based on one or more risk profiles of the tenant, wherein the database system of the tenant comprises at least one database of the tenant, the method comprising:
in response to a request received from a client of the tenant:
automatically detecting a database transaction based on the request, the request comprising a query submitted to the database system or an application programming interface (API) invoked at the database system, wherein the detected database transaction has one or more query language patterns;
analyzing the one or more query language patterns associated with the detected database transaction to automatically associate the detected database transaction with a corresponding transaction category of a plurality of transaction categories for that tenant when the one or more query language patterns are associated with the corresponding transaction category of the plurality of transaction categories, the corresponding transaction category of the plurality of transaction categories having at least one query language pattern associated therewith;
when the detected database transaction is not associated with the corresponding transaction category:
inspecting the detected database transaction; and
sending an instruction to a database monitoring and alerting system to set at least one of a request rate alert and a resource usage alert;
when the detected database transaction is associated with the corresponding transaction category:
determining a corresponding risk profile based on input data for that tenant based on the corresponding transaction category, wherein each transaction category of the plurality of transaction categories has an associated risk profile for that tenant; and
dynamically reconfiguring a monitoring threshold of the database system based on the corresponding risk profile to allow the detected database transaction to proceed without triggering an alert based on the corresponding risk profile.

\* \* \* \* \*